US012136384B2

(12) United States Patent
Sasaki et al.

(10) Patent No.: US 12,136,384 B2
(45) Date of Patent: Nov. 5, 2024

(54) LIGHT-EMITTING ELEMENT DRIVING DEVICE

(71) Applicant: Rohm Co., Ltd., Kyoto (JP)

(72) Inventors: Yoshikazu Sasaki, Kyoto (JP); Kenji Yamada, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 18/272,654

(22) PCT Filed: Nov. 18, 2021

(86) PCT No.: PCT/JP2021/042452
§ 371 (c)(1),
(2) Date: Jul. 17, 2023

(87) PCT Pub. No.: WO2022/153668
PCT Pub. Date: Jul. 21, 2022

(65) Prior Publication Data

US 2024/0078966 A1 Mar. 7, 2024

(30) Foreign Application Priority Data

Jan. 18, 2021 (JP) ................................ 2021-005610

(51) Int. Cl.
*G09G 3/32* (2016.01)
*G09G 3/00* (2006.01)

(52) U.S. Cl.
CPC ............... *G09G 3/32* (2013.01); *G09G 3/006* (2013.01); *G09G 2310/08* (2013.01); *G09G 2330/08* (2013.01)

(58) Field of Classification Search
None
See application file for complete search history.

(56) References Cited

U.S. PATENT DOCUMENTS

2014/0168567 A1* 6/2014 Kikuchi ................ H05B 45/14 349/61

FOREIGN PATENT DOCUMENTS

CN 111025190 A * 4/2020 ................ F02C 9/00
JP 2010182883 8/2010

OTHER PUBLICATIONS

International Search Report for PCT/JP2021/042452 dated Jan. 11, 2020, 5 pages (with English translation).

* cited by examiner

*Primary Examiner* — Duane N Taylor, Jr.
(74) *Attorney, Agent, or Firm* — Fish & Richardson P.C.

(57) ABSTRACT

Connection terminals, corresponding to a plurality of channels, are configured to be connectable to light-emitting units so that driving currents can be supplied to the light-emitting units via the connection terminals individually for each channel. During a non-supply period of the driving currents to the light-emitting units, a sensing process is executed to sense a particular fault. The sensing process includes a first comparison process whereby, with a pull-up current fed toward one of two connection terminals, the voltage at the other connection terminal is compared with a judgment voltage and a second comparison process whereby, with a pull-up current fed toward the other of the two connection terminals, the voltage at the one connection terminal is compared with the judgment voltage.

7 Claims, 13 Drawing Sheets

LIGHT-EMITTING ELEMENT DRIVING DEVICE

CROSS REFERENCE OF RELATED APPLICATIONS

This application is a U.S. National Phase application under 35 U.S.C. § 371 of International Patent Application No. PCT/JP2021/042452, filed on Nov. 18, 2021, which claims the priority of Japanese Patent Application No. 2021-005610, filed on Jan. 18, 2021, the disclosure of which is incorporated herein by reference in its entirety.

TECHNICAL FIELD

The present disclosure relates to light-emitting element driving devices.

BACKGROUND ART

An LED driver drives a light-emitting unit that includes an light-emitting diode (LED). Typically an LED driver is an electronic component built by sealing a semiconductor integrated circuit in a package (housing) formed of resin, and has a plurality of external terminals that are exposed out of the package. The plurality of external terminals include a plurality of connection terminals (LED connection terminals) so that these connection terminals are connected to different light-emitting units respectively. By controlling the light emission brightness of the light-emitting units individually, it is possible to achieve local dimming (local brightness adjustment).

CITATION LIST

Patent Literature

Patent Document 1: JP-A-2010-182883

SUMMARY OF DISCLOSURE

Technical Problem

When an LED driver is mounted on a circuit board, two mutually adjacent connection terminals may be unintentionally short-circuited together with solder or the like. Or, short of being short-circuited, two such connection terminals may be connected together across a considerably low resistive component. Such faults make it impossible to supply the desired driving current to a light-emitting unit. Expectations are high for a technology that allows proper sensing of the presence of a fault. While the discussion thus far has dealt with circumstances around light-emitting element driving devices taking an LED as a light-emitting element constituting a light-emitting unit and taking an LED driver as a light-emitting element driving device, any light-emitting element driving devices directed to light-emitting elements other than LEDs find themselves in similar circumstances.

The present disclosure is aimed at providing a light-emitting element driving device that contributes to the sensing of a fault between adjacent terminals.

Solution to Problem

According to one aspect of the present disclosure, a light-emitting element driving device includes connection terminals corresponding to a plurality of channels, and these connection terminals are configured to be connectable to light-emitting units having one or more light-emitting elements. The light-emitting element driving device is configured to be capable of supplying driving currents to the light-emitting units via the connection terminals individually for each of the channels. The light-emitting element driving device includes a particular fault sensor configured to be capable of executing a sensing process for sensing a particular fault during a non-supply period of the driving currents to the light-emitting units. The particular fault is an abnormality in the resistance value between two connection terminals adjacent to each other among the plurality of connection terminals. The particular fault sensor includes: a pull-up circuit configured to be capable of feeding a pull-up current toward the connection terminals individually for each of the channels; and a comparator configured to compare a voltage at the connection terminals with a predetermined judgment voltage. The sensing process includes: a first comparison process by which, with the pull-up current fed toward one of the two connection terminals, the voltage at the other of the two connection terminals is compared with the judgment voltage; and a second comparison process by which, with the pull-up current fed toward the other of the two connection terminals, the voltage at the one of the two connection terminals is compared with the judgment voltage. Based on the results of the first and second comparison processes, the particular fault sensor senses the presence or absence of the particular fault at the two connection terminals.

Advantageous Effects of Disclosure

According to the present disclosure, it is possible to provide a light-emitting element driving device that contributes to the sensing of a fault between adjacent terminals.

DESCRIPTION OF EMBODIMENTS

Figure 1:
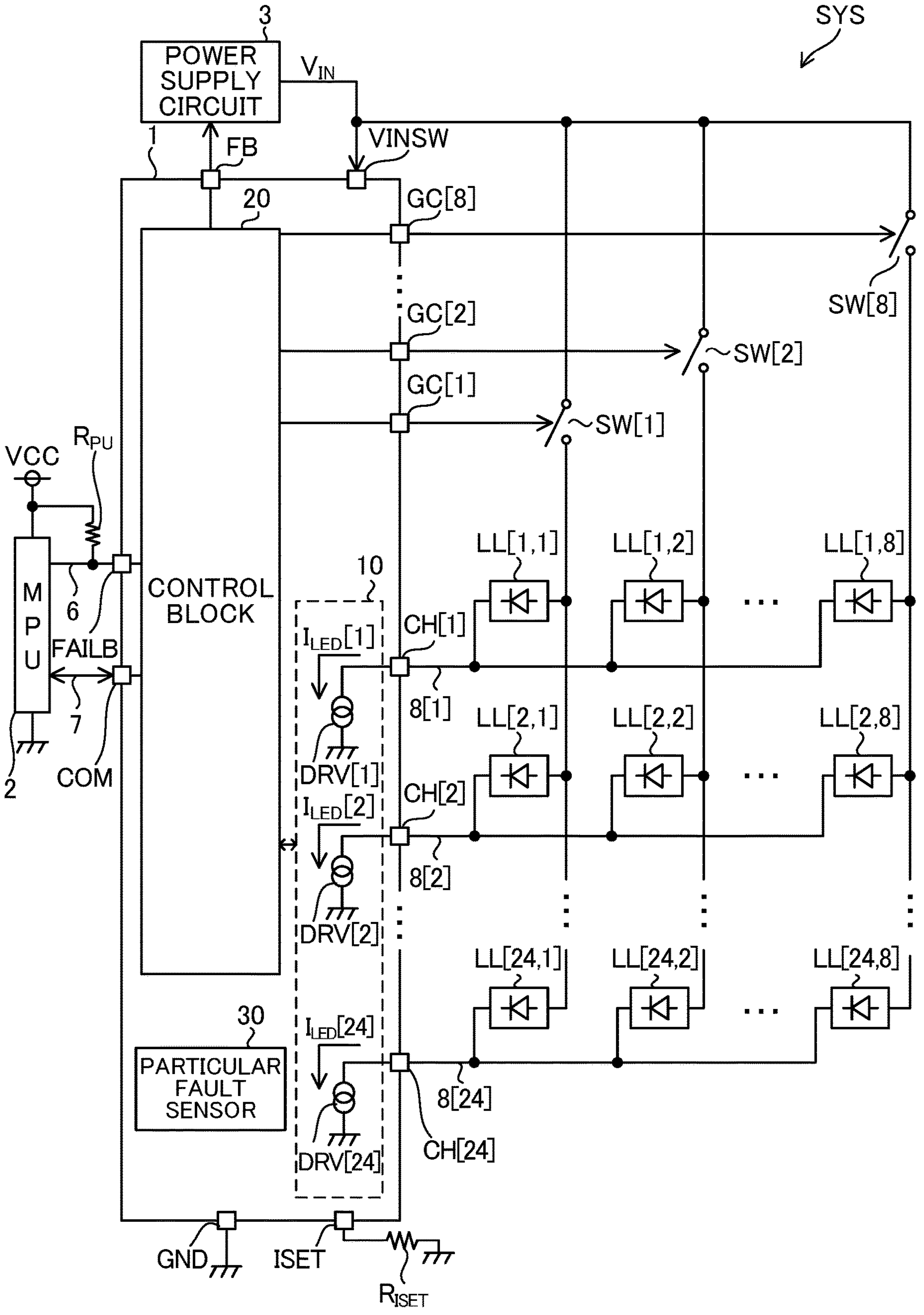
FIG. 1 is an overcall configuration diagram of a light-emitting system according to an embodiment of the present disclosure.

Examples of implementing the present disclosure will be specifically described below with reference to the accompanying drawings. Among the diagrams referred to in the course, the same parts are identified by the same reference signs, and in principle no overlapping description of the same parts will be repeated. In the present description, for the sake of simplicity, symbols and reference signs referring to information, signals, physical quantities, elements, parts, and the like are occasionally used with omission or abbreviation of the names of the information, signals, physical quantities, elements, parts, and the like corresponding to those symbols and reference signs. For example, the connection terminal described later and identified by the reference sign "CH[1]" (see FIG. 1) is sometimes referred to as the connection terminal CH[1] and other times abbreviated to the terminal CH[1], both referring to the same entity.

First, some of the terms used to describe embodiments of the present disclosure will be defined. "Ground" denotes a reference conductor at a reference potential of 0 V (zero volts), or to a potential of 0 V itself. A reference conductor is formed of an electrically conductive material such as metal. A potential of 0 V is occasionally referred to as a ground potential. In embodiments of the present disclosure, any voltage mentioned with no particular reference mentioned is a potential relative to the ground.

"Level" denotes the level of a potential, and for any signal or voltage of interest, "high level" has a higher potential than "low level". For any signal or voltage of interest, its being at high level means, more precisely, its level being equal to high level, and its being at low level means, more precisely, its level being equal to low level. A level of a signal is occasionally referred to as a signal level, and a level of a voltage is occasionally referred to as a voltage level.

For any transistor configured as an FET (field-effect transistor), which can be a MOSFET, "on state" refers to a state where the drain-source channel of the transistor is conducting, and "off state" refers to a state where the drain-source channel of the transistor is not conducting (cut off). Similar definitions apply to any transistor that is not classified as an FET. Unless otherwise stated, any MOSFET can be understood to be an enhancement MOSFET. "MOSFET" is an abbreviation of "metal-oxide-semiconductor field-effect transistor".

Any switch can be configured with one or more FETs (field-effect transistors). When a given switch is in the on state, the switch conducts across its terminals; when a given switch is in the off state, the switch does not conduct across its terminals. In the following description, for any transistor or switch, its being in the on or off state is occasionally expressed simply as its being on or off respectively. For any transistor or switch, a period in which it is in the on state is often referred to as the on period, and a period in which it is in the off state is often referred to as the off period. Unless otherwise stated, wherever "connection" is discussed among a plurality of parts constituting a circuit, as among given circuit elements, wirings (conductors), nodes, and the like, the term is to be understood to denote "electrical connection".

FIG. 1 is an overall configuration diagram of a light-emitting system SYS according to an embodiment of the present disclosure. The light-emitting system SYS includes an LED driver 1 as an example of a light-emitting element driving device, an MPU (microprocessor unit) 2 for controlling the LED driver 1, a plurality of light-emitting units that are driven by the LED driver 1, and a power supply circuit 3 that outputs a supply voltage $V_{IN}$. The supply voltage $V_{IN}$ is a positive direct-current voltage. The LED driver 1 has a terminal VINSW at which it receives the supply voltage $V_{IN}$, and operates based on the supply voltage $V_{IN}$. The light-emitting system SYS further includes, as components of it, wirings 6, 7, and 8[1] to 8[24], a pull-up resistor $R_{PU}$, and a current setting resistor $R_{ISET}$. The power supply circuit 3 may be included in the LED driver 1 as a component of it. In that case, a terminal FB, described later, functions as an internal terminal of the LED driver 1.

Where no distinction is needed among the plurality of light-emitting units in the light-emitting system SYS, a light-emitting unit will be referred to as the light-emitting unit LL. Each light-emitting unit LL includes one or more LEDs (light-emitting diodes). For example, each light-emitting unit LL is configured as a series circuit of a plurality of LEDs. Instead, each light-emitting unit LL may be configured with a parallel circuit of a plurality of LEDs, or both a series circuit of a plurality of LEDs and a parallel circuit of a plurality of LEDs may together constitute one light-emitting unit LL. Even a single LED may constitute one light-emitting unit LL. Each light-emitting unit LL has a high-potential terminal and a low-potential terminal, and each LED in a light-emitting unit LL has a forward direction pointing from the high-potential terminal to the low-potential terminal.

Figure 2:
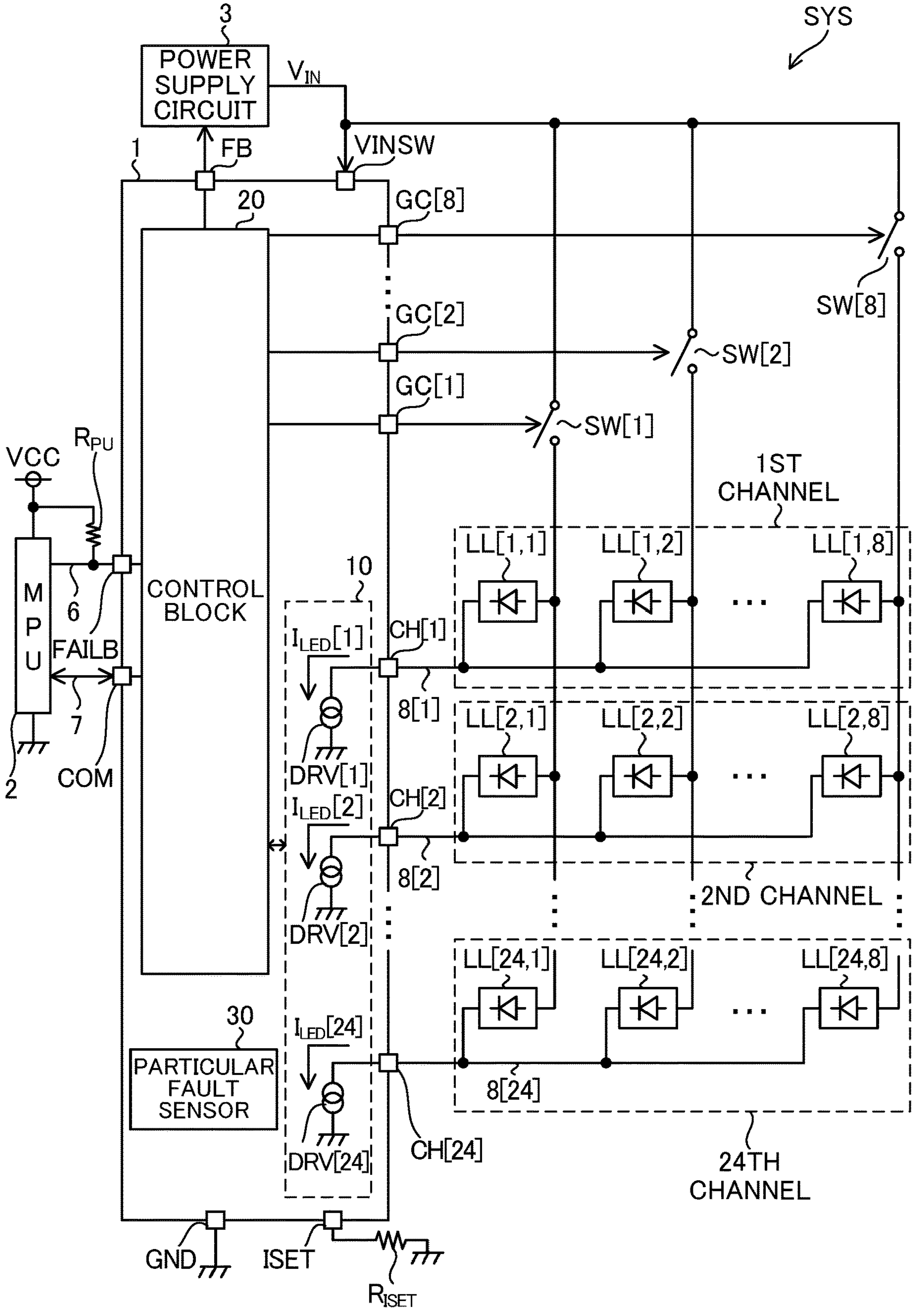
FIG. 2 is a diagram illustrating a plurality of channels in a light-emitting system according to the embodiment of the present disclosure.
Figure 3:
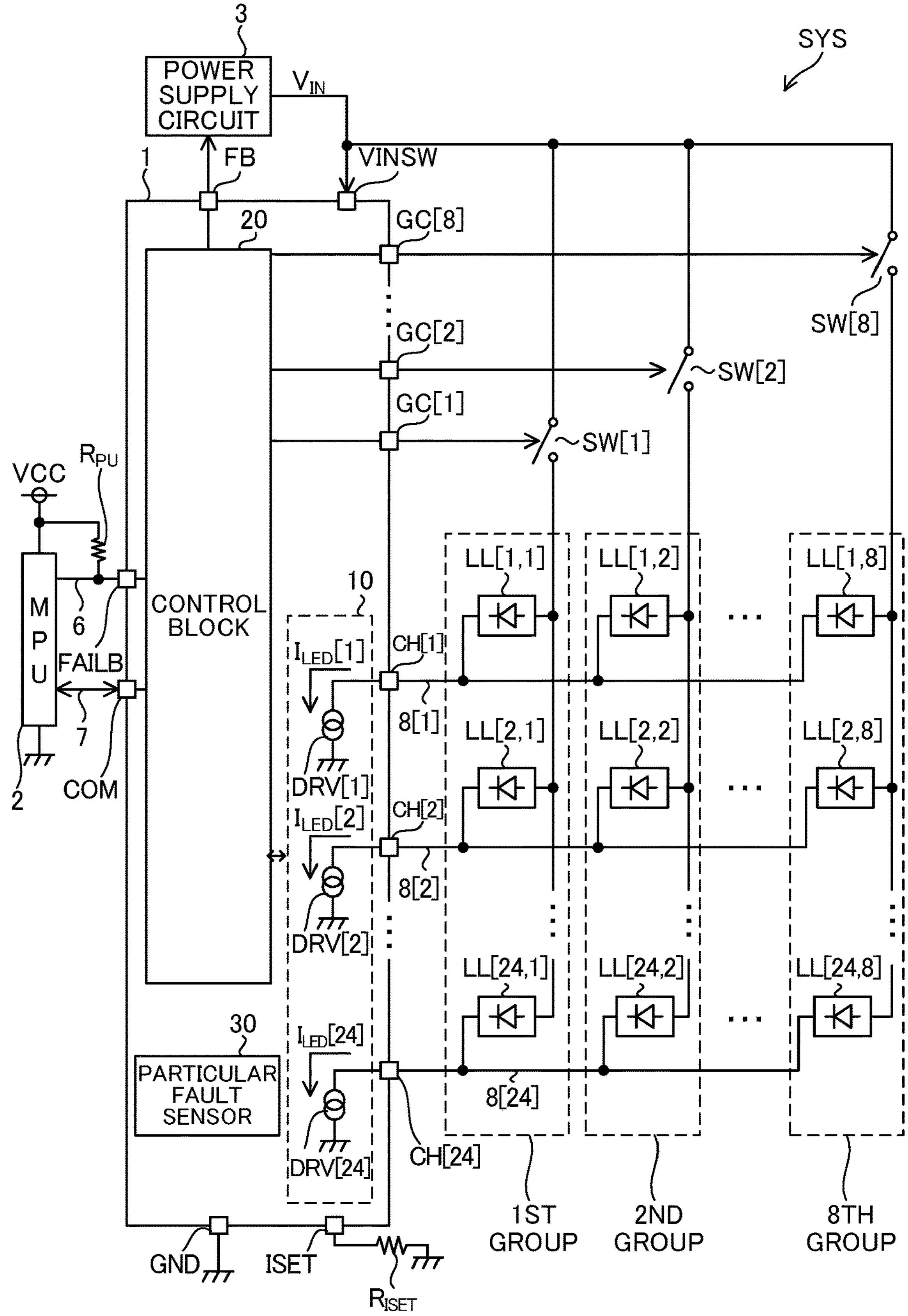
FIG. 3 is a diagram illustrating a plurality of groups in a light-emitting system according to the embodiment of the present disclosure.

It is here assumed that the light-emitting system SYS includes, as the plurality of light-emitting units LL, a total of 24×8 light-emitting units LL, and these 24×8 light-emitting units LL will be identified by the symbols LL[1, 1] to LL[24, 8]. A given light-emitting unit LL among the light-emitting units LL[1, 1] to LL[24, 8] will be referred to as the light-emitting unit LL[i, j], where i is any integer fulfilling $1 \leq i \leq 24$ and j is any integer fulfilling $1 \leq j \leq 8$. The light-emitting system SYS and the LED driver 1 have a 1st to a 24th channel such that, as shown in FIG. 2, the light-emitting units LL[i, 1] to LL[i, 8] belong to the ith channel (in other words, correspond to the ith channel). On the other hand, the light-emitting units LL[1, 1] to LL[24, 8] can be classified into a first to an eighth group such that, as shown in FIG. 3, the light-emitting units LL[1, j] to LL[24, j] belong to the jth group (in other words, correspond to the jth group).

The LED driver 1 has as many connection terminals CH[1] to CH[24] as the total number of channels. The connection terminal CH[i] belongs to the ith channel (in other words, corresponds to the ith channel). The connection terminal CH[i] is a light-emitting unit connection terminal to which to connect the light-emitting units LL[i, 1] to LL[i, 8] that belong to the ith channel. Where no distinction is needed among the connection terminals CH[1] to CH[24], a connection terminal will occasionally be referred to as the connection terminal CH.

The light-emitting system SYS has as many SW[1] to SW[8] as the total number of groups. The SW[j] is the switch that corresponds to the jth group. One terminals of all the switches SW[1] to SW[8] are connected to the output terminal of the power supply circuit 3 to receive the output voltage of the power supply circuit 3 (i.e., the supply voltage $V_{IN}$). The other terminal of the switch SW[j] is connected to the high-potential terminals of all the light-emitting units LL[1, j] to LL[24, j] that belong to the jth group. The low-potential terminals of all the light-emitting units LL[i, 1] to LL[i, 8] that belong to the ith channel are connected to the wiring 8[*i*]. The wiring 8[*i*] is connected to the connection terminal CH[i].

The LED driver 1 includes a driver block 10 and a control block 20. The driver block 10 includes current drivers DRV[1] to DRV[24]. The current driver DRV[i] belongs to the ith channel (in other words, corresponds to the ith channel). Thus, the driver block 10 includes current drivers one for each of the channels. Where no distinction is needed among the total of 24 current drivers provided on for each channel, a current driver will occasionally be referred to as the current driver DRV. The current drivers DRV[1] to DRV[24] are identical in configuration and function. In each channel, the current driver DRV[i] includes a constant current circuit; in normal lighting operation, under the control of the control block 20, the current driver DRV[i] operates such that a driving current $I_{LED}$[i] passes in the direction from the connection terminal CH[i] to the ground. As a result of the driving current $I_{LED}$[1] passing via the connection terminals CH[1] to the light-emitting units LL[1, j], the light-emitting unit LL[1, j] emits light and, as a result of the driving current $I_{LED}$[2] passing via the connection terminals CH[2] to the light-emitting units LL[2, j], the light-emitting unit LL[2, j] emits light. A similar description applies to any other driving current and any other light-emitting unit.

The control block 20 comprehensively controls the operation of components within the LED driver 1. The LED driver 1 has terminals GC[1] to GC[8] that are connected to the control terminals of the switches SW[1] to SW[8]. The control block 20 can, via the terminals GC[1] to GC[8], turn the switches SW[1] to SW[8] on and off individually. The switches SW[1] to SW[8] can each be implemented with, for example, a P-channel MOSFET (metal-oxide-semiconductor field-effect transistor). In that case, the sources of all the MOSFETs as the switches SW[1] to SW[8] can be fed with the supply voltage $V_{IN}$, the drain of the MOSFET as the switches SW[j] can be connected to the high-potential terminals of all the light-emitting units LL[1, j] to LL[24, j], and the control block 20 can control, via the terminals GC[1] to GC[8], the gate potentials of the MOSFETs as the switches SW[1] to SW[8]. The control block 20 has the function of, in normal lighting operation, adjusting the supply voltage $V_{IN}$ of the power supply circuit 3 via a terminal FB based on the voltages at the connection terminals CH[1] to CH[24].

The LED driver 1 has a terminal FAILB that is connected via the wiring 6 to the MPU 2. The MPU 2 operates based on a supply voltage VCC, which is a predetermined positive direct-current voltage. The wiring 6 that connects between the terminal FAILB and the MPU 2 is connected via the pull-up resistor $R_{PU}$ to an application terminal for the supply voltage VCC (a terminal to which the supply voltage VCC is applied). The MPU 2 is connected also via a communication wiring 7 to a terminal COM, which is a communication terminal of the LED driver 1. The LED driver 1 and the MPU 2 can communicate with each other bidirectionally via a communication wiring 4. By this bidirectional communication, the MPU 2 can transmit desired commands to the LED driver 1 and the LED driver 1 can transmit signals responding to the received commands to the MPU 2. While FIG. 1 shows only one terminal COM, in practice the terminal COM comprises a plurality of external terminals and, corresponding to them, the communication wiring 7 comprises a plurality of wirings. Any method of communication can be adopted between the LED driver 1 and the MPU 2, and it can be one complying with SPI (serial peripheral interface).

The LED driver 1 also has terminals GND and $I_{ISET}$. The terminal GND is connected to the ground. The current setting resistor $R_{ISET}$ is provided outside the LED driver 1. One terminal of the current setting resistor $R_{ISET}$ is connected to the terminal $I_{ISET}$, and the other terminal of the current setting resistor $R_{ISET}$ is connected to the ground. Based on the value of the current setting resistor $R_{ISET}$ and commands from the MPU 2, the control block 20 can set the magnitudes of the driving currents $I_{LED}$[1] to $I_{LED}$[24] individually.

The LED driver 1 includes, as a distinctive component of it, a particular fault sensor 30. The configuration and function of the particular fault sensor 30 will be described later.

Figure 4:
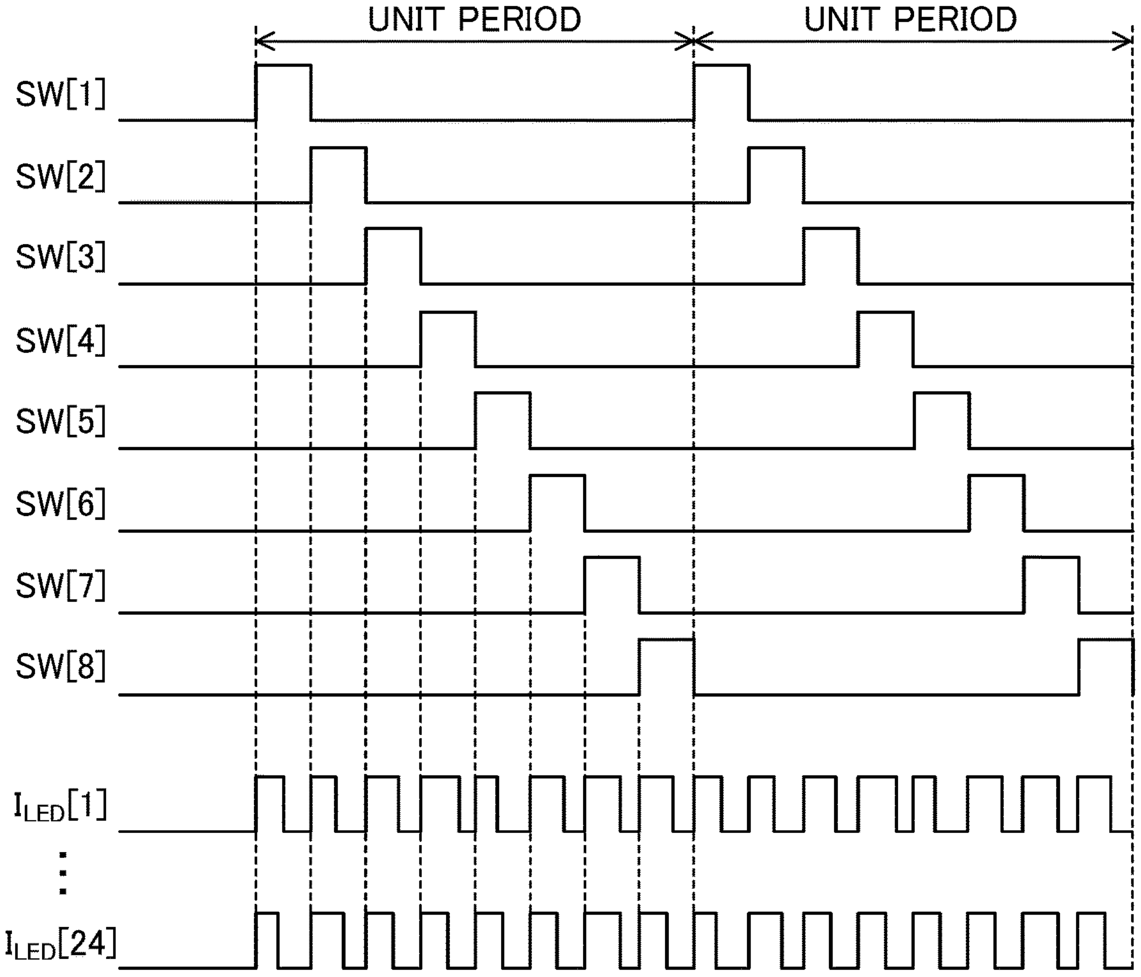
FIG. 4 is a timing chart of eight-part time-division lighting operation that can be performed in a light-emitting system according to the embodiment of the present disclosure.

With reference to FIG. 4, a description will be given of eight-part time-division lighting operation as one type of normal lighting operation. In eight-part time-division lighting operation, a unit period with a predetermined length of time is set. The unit period is set repeatedly at a predetermined cycle. Each unit period is divided into eight parts and so a first to an eighth division period are set. In the first to eighth division periods the control block 20 turns on the switches SW[1] to SW[8] one by one. Specifically, in the jth division period, out of the switches SW[1] to SW[8], only the switch SW[j] is kept on, with the seven other switches kept off. Accordingly, in the jth division period, the supply voltage $V_{IN}$ is supplied via the switch[j] only to the high-potential terminals of the light-emitting units LL[1, j] to LL[24, j] of the jth group out of the first to eighth groups so that only the light-emitting units LL[1, j] to LL[24, j] can emit light.

In each of the first to eighth division periods, the control block 20 drives the current driver DRV by PWM for each channel. PWM is short for pulse-width modulation. In PWM driving in each division period, the time span (i.e., length of time) for which the driving current $I_{LED}$[i] is supplied is controlled for each channel. Specifically, the time spans for which the driving currents $I_{LED}$[1] to $I_{LED}$[24] are supplied are controlled individually by PWM. In that way, in each division period the corresponding light-emitting units LL are pulse-lit and, through such control of time spans, the average brightness of the total of 24×8 light-emitting units LL is controlled individually.

For example, in a case where a light-emitting block comprising the light-emitting units LL[1, 1] to LL[24, 8] is used as a light source for a display panel (display screen)

such as a liquid crystal display panel, the unit period can be set in synchronization with a vertical synchronizing signal fed to the LED driver 1 from the outside. In that case, the unit period is set repeatedly at the cycle of the vertical synchronizing signal. The entire display region of the display panel is divided into a plurality of division regions (e.g., 24×8 division regions), with each division region assigned one or more light-emitting units LL. Then, according to the brightness and the like of the image to be displayed in each display region, the light emission brightness of the corresponding light-emitting units LL can be adjusted, and it is thus possible to achieve local dimming (local brightness adjustment) corresponding to the total number of division regions.

While the above description deals with, as an example of normal lighting operation, eight-part time-division lighting operation, normal lighting operation can be any operation in which the driving current $I_{LED}$[i] is supplied to any one or more light-emitting units LL[i, j] to make them emit light. For example, the driving currents $I_{LED}$[1] to $I_{LED}$[24] can be supplied constantly during the on-period of the switch SW[j] to perform DC driving, or two or more of the switches SW[1] to SW[8] can be kept on simultaneously.

Figure 5:
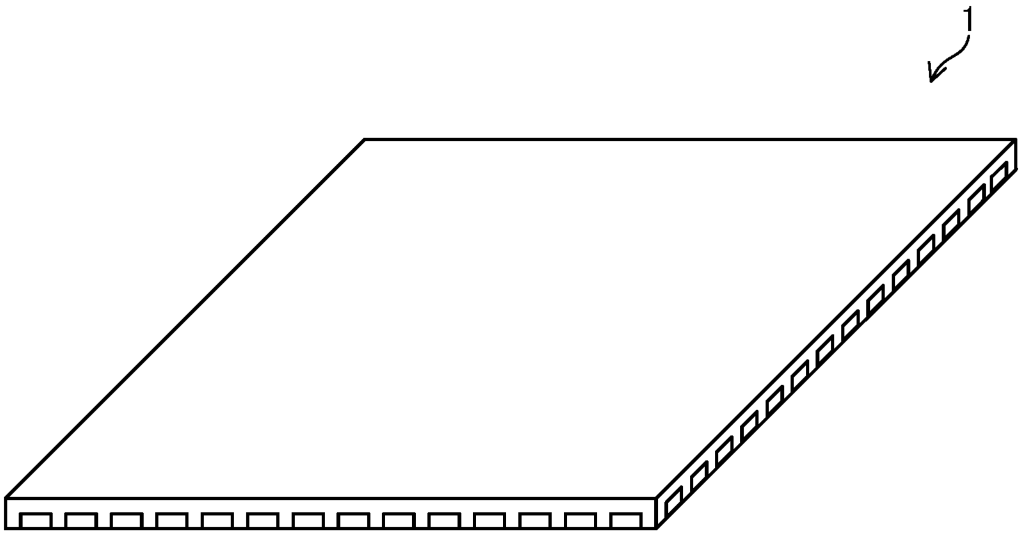
FIG. 5 is an external perspective view of an LED driver according to the embodiment of the present disclosure.

FIG. 5 is an exterior perspective view of the LED driver 1. The functional blocks (including 10, 20, and 30) that constitute the LED driver 1 are configured as a semiconductor integrated circuit. The LED driver 1 is an electronic component built by sealing the semiconductor integrated circuit in a package (housing) formed of resin. The package of the LED driver 1 has a plurality of external terminals exposed out of the package. The plurality of terminals of the LED driver 1 include the above-mentioned terminals CH[1] to CH[24], GC[1] to CH[8], FB, VINSW, FAILB, COM, ISET, and GND. The LED driver 1 also has other external terminals, which will not be described specifically.

Figure 6:
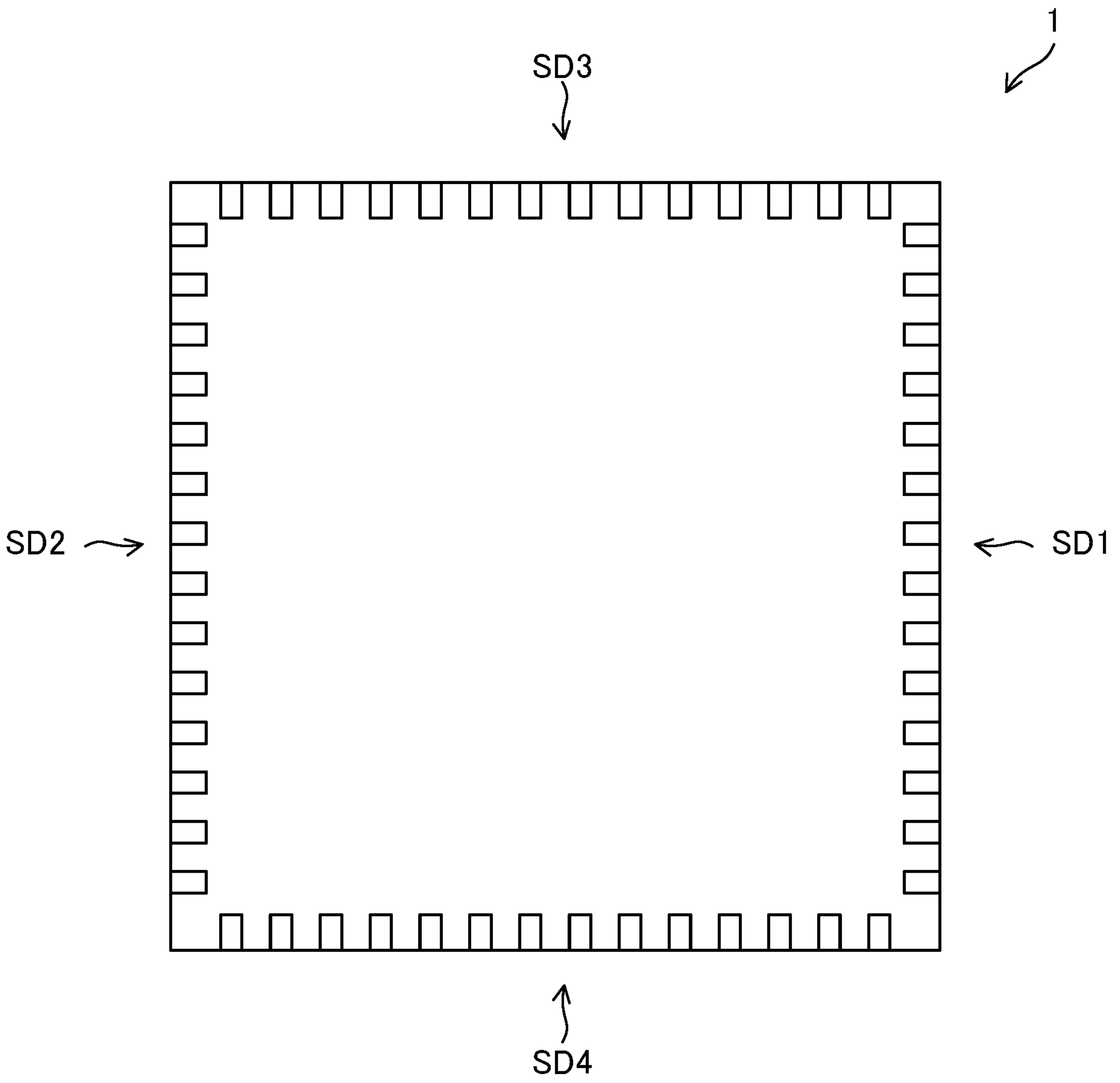
FIG. 6 is a plan view of an LED driver according to the embodiment of the present disclosure.

FIG. 6 is a schematic plan view of the LED driver 1 as seen on its face where the external terminals are arranged. In the example taken here, the LED driver 1 has a package (housing) called QFN (quad flat no-lead). In this case, the LED driver 1 has a package substantially in the shape of a rectangular parallelepiped, and has a plurality of external terminals along each of the four sides SD1 to SD4 of the face constituting the bottom face of the package (FIG. 6 is a plan view as seen on the bottom face). The LED driver 1 may have any package other than QFN, examples including DFN (dual flat no-lead) and SOP (small outline package).

The bottom face of the package of the LED driver 1 has a rectangular shape (which can be square). The four sides of the rectangular shape comprise sides SD1 and SD2 that lie opposite each other and sides SD3 and SD4 that lie opposite each other. The external terminals of the LED driver 1 are each arranged at one of the sides SD1 to SD4. With attention paid to the connection terminals CH[1] to CH[24], these connection terminals CH[1] to CH[24] are arranged at, so as to be distributed among, one or more of the sides SD1 to SD4. For example, the connection terminals CH[1] to CH[12] can be arranged along the side SD1 and the connection terminals CH[13] to CH[24] can be arranged along the side SD2.

Figure 7:
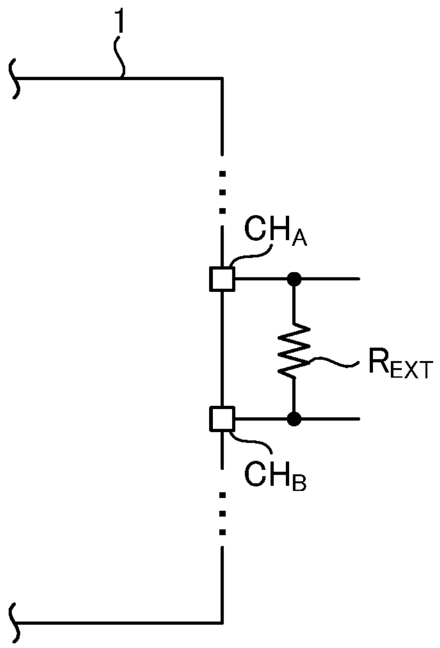
FIG. 7 is a diagram illustrating a relationship between two adjacent connection terminals according to the embodiment of the present disclosure.

If two connection terminals CH are arranged along the same side (e.g., SD1) so as to be adjacent to each other, the two connection terminals CH may be short-circuited with solder, condensed moisture, or the like. Or, short of being short-circuited, two such connection terminals may be connected together across a considerably low resistive component. Such states will here be referred to as particular faults. As shown in FIG. 7, two connection terminals CH that are arranged along the same side so as to be adjacent to each other will be referred to as connection terminals $CH_A$ and $CH_B$. No other external terminal is arranged between the connection terminals $CH_A$ and $CH_B$. In FIG. 7, the resistance identified by the symbol "$R_{EXT}$" is not a resistor that is purposefully provided in the light-emitting system SYS but is a resistive component that has unexpectedly come to exist between the connection terminals $CH_A$ and $CH_B$ outside the LED driver 1. The resistance $R_{EXT}$ results from, for example, solder that, when the LED driver 1 is mounted on a circuit board (not shown), may be unintentionally left between the connection terminals $CH_A$ and $CH_B$ on the circuit board, or moisture that may form between the connection terminals $CH_A$ and $CH_B$ by condensation, or foreign matter that may deposit between the connection terminals $CH_A$ and $CH_B$ due to soil or the like.

A particular fault at the connection terminals $CH_A$ and $CH_B$ is an abnormality in the resistance value between the connection terminals $CH_A$ and $CH_B$ (i.e. the value of the resistance $R_{EXT}$), and is more specifically a fault in which the resistance value between the connection terminals $CH_A$ and $CH_B$ (i.e., the value of the resistance $R_{EXT}$) becomes a predetermined value or lower. In other words, a particular fault between the connection terminals $CH_A$ and $CH_B$ is a fault in which a potential difference between the connection terminals $CH_A$ and $CH_B$ causes a significant current to pass between the connection terminals $CH_A$ and $CH_B$. A state where the connection terminals $CH_A$ and $CH_B$ are short-circuited together corresponds to a state where the value of the resistance $R_{EXT}$ is considerably low, and thus counts as a particular fault.

The particular fault sensor 30 (see FIG. 1) executes a particular fault sensing process, which is a process for sensing particular faults. The particular fault sensor 30 senses the presence or absence of a particular fault at the connection terminals $CH_A$ and $CH_B$ based on the voltages at the connection terminals $CH_A$ and $CH_B$. When driving currents are passing across the connection terminals $CH_A$ and $CH_B$ (for example, when the driving currents $I_{LED}$[1] and $I_{LED}$[2] are passing across the connection terminals CH[1] and CH[2]), the voltages at the connection terminals $CH_A$ and $CH_B$ depend on the supply voltage $V_{IN}$ and the voltage drop across the corresponding light-emitting units LL. Among a plurality of light-emitting units LL, the voltage drops across them are generally equal; thus, when driving currents are passing across the connection terminals $CH_A$ and $CH_B$, regardless of the presence or absence of a particular fault, the voltages at the connection terminals $CH_A$ and $CH_B$ are generally equal. This makes it difficult to determine the presence or absence of a particular fault when driving currents are being supplied. With this taken into consideration, the particular fault sensor 30 executes the particular fault sensing process during a non-supply period of the driving currents to the light-emitting units LL. The non-supply period of the driving currents to the light-emitting units LL is the period during which the light-emitting block comprising the light-emitting units LL[1, 8] to LL[24, 8] is not supplied with the driving currents $I_{LED}$[1] to $I_{LED}$[24] (in other words, the period during which the driver block 10 does not supply the light-emitting block comprising the light-emitting units LL[1, 8] to LL[24, 8] with the driving currents $I_{LED}$[1] to $I_{LED}$[24]), and can be any period other than the period during which the normal lighting operation described above is performed. In the non-supply period of the driving currents to the light-emitting units LL, the switches SW[1] to SW[8] are all off, and the high-potential terminals of the light-emitting units LL are open.

For example, when the LED driver 1 starts to be supplied with a supply voltage $V_{IN}$ that can make it start up and thus the LED driver 1 starts up, the control block 20 first executes a predetermined start-up initial process and, on competing its execution, effects a transition to a normal mode, in which it can perform normal lighting operation. During the execution period of the start-up initial process, normal lighting operation is not performed. During the execution period of the start-up initial process, the control block 20 receives a predetermined test instruction command from the MPU 2 and, on receiving it, makes the particular fault sensor 30 execute the particular fault sensing process. When the particular fault sensing process is executed, until its execution is completed, no transition to the normal mode is allowed; after completion of execution of the particular fault sensing process, a transition to the normal mode is permitted.

Figure 8:
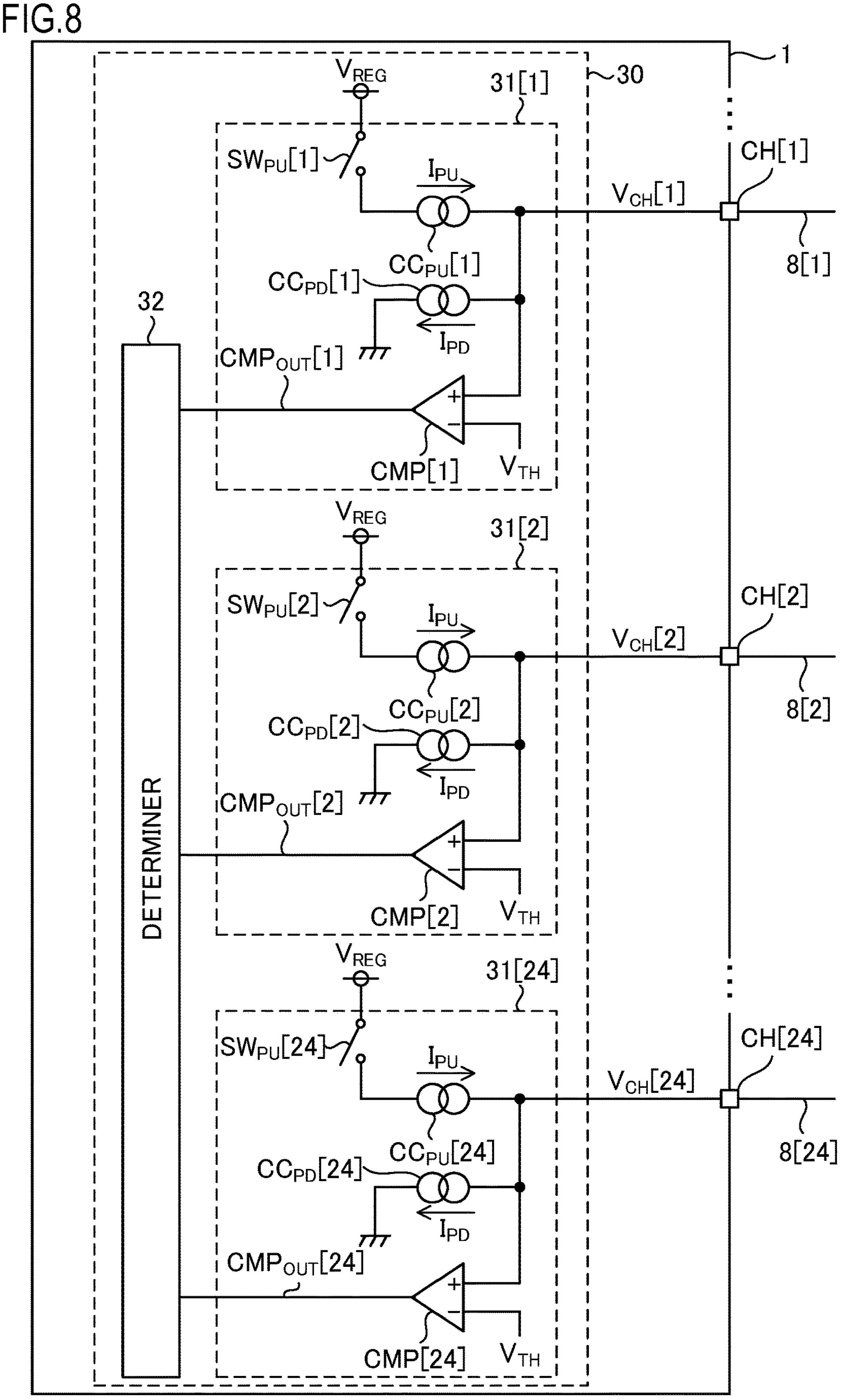
FIG. 8 is a diagram showing a configuration of a particular fault sensor according to the embodiment of the present disclosure.

FIG. 8 shows the internal configuration of the particular fault sensor 30. The particular fault sensor 30 includes a sensing circuit for each channel. Where no distinction is needed among the plurality of sensing circuits corresponding to the plurality of channels, a sensing circuit will be referred to as the sensing circuit 31. The sensing circuit corresponding to the ith channel will be identified specifically by the symbol "31[*i*]". The particular fault sensor 30 includes sensing circuits 31[1] to 31[24]. The particular fault sensor 30 further includes a determiner 32. Each sensing circuit 31 includes a control switch, a pull-up constant-current circuit, a pull-down constant-current circuit, and a comparator. The control switch, the pull-up constant-current circuit, the pull-down constant-current circuit, and the comparator in the sensing circuit 31[*i*] will be identified by the symbols "$SW_{PU}$[i]", "$CC_{PU}$[i]", "$CC_{PD}$[i]", and "CMP[i]" respectively. The voltage at the connection terminal CH will be referred to as the terminal voltage, and the terminal voltage at the connection terminal CH[i] will be specifically identified by the symbol "$V_{CH}$[i]". The output signal of the comparator will be referred to as the comparison result signal, and the output signal of the comparator CMP[i] will be specifically identified by the symbol "$CMP_{OUT}$[i]".

The sensing circuits 31[1] to 31[24] are identical in configuration. The interconnection between the sensing circuit 31 and the corresponding connection terminal CH is identical among the 1st to 24th channels. Accordingly, with attention paid to the ith channel ($1 \le i \le 24$), a description will be given of the configuration and operation of the sensing circuit 31[*i*] and the interconnection between the sensing circuit 31[*i*] and the connection terminal CH[i].

In the sensing circuit 31[*i*], one terminal of the control switch $SW_{PU}$[i] is connected to an application terminal for a predetermined internal voltage VREG (i.e., a terminal to which the internal voltage VREG is applied), and the other terminal of the control switch $SW_{PU}$[i] is connected via the pull-up constant-current circuit $CC_{PU}$[i] to the connection terminal CH[i]. The connection terminal CH[i] is connected via the pull-down constant-current circuit $CC_{PD}$[i] to the ground, and is also connected to the non-inverting terminal of the comparator CMP[i]. The inverting input terminal of the comparator CMP[i] is fed with a predetermined judgment voltage VTH. The internal voltage VREG and the judgment voltage VTH are positive direct-current voltages that are generated based on the supply voltage $V_{IN}$ in an internal power supply circuit (not shown) within the LED driver 1. The internal voltage VREG (e.g., 3.3 V) is higher than the judgment voltage VTH (e.g., 0.15 V).

The control switches $SW_{PU}$[i] and the constant-current circuit $CC_{PU}$[i] constitute a pull-up circuit that can feed a pull-up current $I_{PU}$ toward the connection terminal CH[i]. Specifically, in the sensing circuit 31[*i*], only when the control switches $SW_{PU}$[i] is on does the pull-up constant-current circuit $CC_{PU}$[i] receive the internal voltage VREG and generate the pull-up current $I_{PU}$ based on the internal voltage VREG to feed the pull-up current $I_{PU}$ (i.e., a positive charge resulting from the pull-up current $I_{PU}$) from an application terminal for the internal voltage VREG to the connection terminal CH[i]. During the on-period of the control switches $SW_{PU}$[i], the constant-current circuit $CC_{PU}$[i] operates such that a pull-up current $I_{PU}$ with a predetermined current value $I_{PU\_VAL}$ is fed toward the connection terminal CH[i], but does not have the capacity to raise the terminal voltage $V_{CH}$[i] to higher than the internal voltage VREG. Accordingly, during the on-period of the control switches $SW_{PU}$[i], until the terminal voltage $V_{CH}$[i] reaches the internal voltage VREG, the value of the pull-up current $I_{PU}$ is equal to the current value $I_{PU\_VAL}$ but, with the terminal voltage $V_{CH}$[i] having substantially reached the internal voltage VREG, the value of the pull-up current $I_{PU}$ is smaller than the current value $I_{PU\_VAL}$. During the off-period of the control switches $SW_{PU}$[i], the constant-current circuit $CC_{PU}$[i] does not generate the pull-up current $I_{PU}$ and no current passes between the constant-current circuit $CC_{PU}$[i] and the connection terminal CH[i].

In the sensing circuit 31[*i*], the pull-down constant-current circuit $CC_{PD}$[i] constantly draws the pull-down current $I_{PD}$ (a positive charge resulting from the pull-down current $I_{PD}$) from the connection terminal CH[i] (i.e., from the connection node between the pull-up constant-current circuit $CC_{PU}$[i] and the connection terminal CH[i]) to the ground. The constant-current circuit $CC_{PD}$[i] operates such that a pull-down current $I_{PD}$ with a predetermined current value $I_{PD\_VAL}$ is drawn from the connection terminal CH[i] toward the ground, but does not have the capacity to drop the terminal voltage $V_{CH}$[i] to lower than 0 V. Accordingly, if the terminal voltage $V_{CH}$[i] is higher than 0 V, the value of the pull-down current $I_{PD}$ is equal to the current value $I_{PP\_VAL}$ but, with the terminal voltage $V_{CH}$[i] having substantially fallen to 0 V, the value of the pull-down current $I_{PD}$ is smaller than the current value $I_{PP\_VAL}$ (and can be zero).

The current value $I_{PD\_VAL}$, which is the set value of the magnitude of the pull-down current $I_{PD}$, is smaller than the current value $I_{PU\_VAL}$, which is the set value of the magnitude of the pull-up current $I_{PU}$. For example, the current value $I_{PU\_VAL}$ is 3 mA (milliamperes) and the current value $I_{PD\_VAL}$ is 20 μA (microamperes). The pull-down current $I_{PD}$ has the function of, by feeding the pull-up current $I_{PU}$, discharging the positive charge stored at the connection terminal CH[i]. Thus the pull-down current $I_{PD}$ can be called the discharge current, and the pull-down constant-current circuit $CC_{PD}$[i] can be called the discharge constant-current circuit $CC_{PD}$[i].

In the sensing circuit 31[*i*], the comparator CMP[i] compares the terminal voltage $V_{CH}$[i] with a predetermined judgment voltage VTH to output a comparison result signal $CMP_{OUT}$[i] that indicates the result of the comparison. The comparison result signal $CMP_{OUT}$[i] is a binary signal that takes as its signal level high level or low level. The comparator CMP[i], if the terminal voltage $V_{CH}$[i] is higher than the judgment voltage VTH, keeps the comparison result signal $CMP_{OUT}$[i] at high level and, if the terminal voltage $V_{CH}$[i] is lower than the judgment voltage VTH, keeps the comparison result signal $CMP_{OUT}$[i] at low level. If the terminal voltage $V_{CH}$[i] is just equal to the judgment voltage VTH, the comparison result signal $CMP_{OUT}[i]$ is at high or low level. The determiner 32 is fed with the comparison result signals $CMP_{OUT}[1]$ to $CMP_{OUT}[24]$. Based on the comparison result signals $CMP_{OUT}[1]$ to $CMP_{OUT}[24]$, the determiner 32 checks the presence or absence of a particular fault between, out of the connection terminals CH[1] to CH[24], two given connection terminals CH that are in a similar relationship to the connection terminals $CH_A$ and $CH_B$ (see FIG. 7). Now, by way of a plurality of practical examples, some specific examples of the configuration and operation of the particular fault sensor 30, the LED driver 1, or the light-emitting system SYS will be presented along with applied and modified technologies associated with them. Unless otherwise stated or unless inconsistent, any description given above in connection with the embodiment applies to the practical examples presented below. For any description of the practical examples that contradicts what has been described above, the description given in connection with the practical examples can prevail. Unless inconsistent, any description given in connection with any one of the practical examples presented below applies to any other practical example (i.e., any two or more of the practical examples can be implemented in combination).

Practical Example 1

Practical Example 1 will be described. Practical example 1 assumes that the connection terminals $CH_A$ and $CH_B$ in FIG. 7 correspond to the connection terminals CH[1] and CH[2] and deals with a method of sensing the presence or absence of a particular fault at the connection terminals CH[1] and CH[2]. Accordingly, the resistance $R_{EXT}$ mentioned in connection with Practical Example 1 denotes the resistive component between the connection terminals CH[1] and CH[2] and a particular fault mentioned in connection with Practical Example 1 denotes a particular fault at the connection terminals CH[1] and CH[2].

In the particular fault sensing process, the particular fault sensor 30 sets a first check period and a second check period. The first and second check periods are two periods that do not overlap each other. While the first and second check periods may occur in any order, it is here assumed that they are set such that the first check period is followed by the second check period (the same applies to any other practical example described later).

Figure 9:
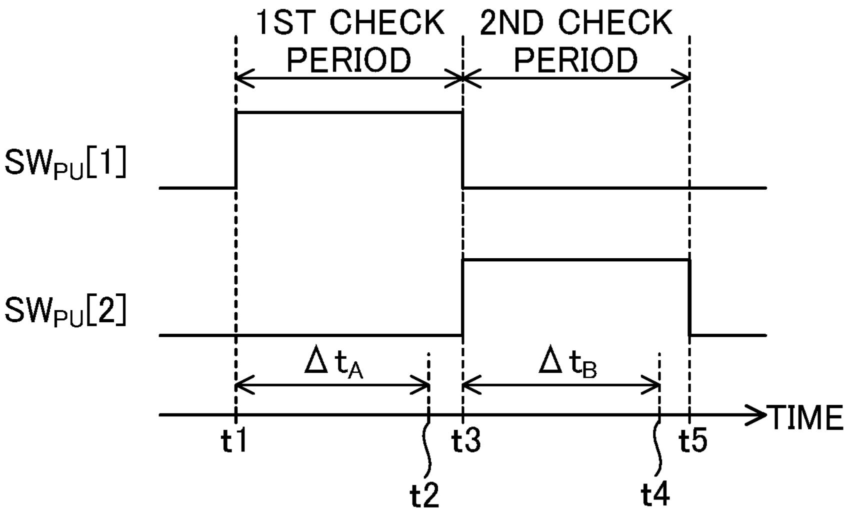
FIG. 9 is a diagram illustrating a first and a second check period that are set in a particular fault sensing process according to the embodiment of the present disclosure.

As described above, during the non-supply period of the driving currents to the light-emitting units LL, the particular fault sensing process is executed and thus, during neither of the first and second check periods are the light-emitting units LL supplied with driving currents (that is, the light-emitting units LL are in a non-light-emitting state). As shown in FIG. 9, during the first check period, the particular fault sensor 30 keeps the control switch $SW_{PU}[1]$ on and keeps the control switch $SW_{PU}[2]$ off Thus, during the first check period, the pull-up circuit of the first channel (i.e., $SW_{PU}[1]$, $CC_{PU}[1]$) feeds the pull-up current $I_{PU}$ toward the connection terminal CH[1] and the pull-up circuit of the second channel (i.e., $SW_{PU}[2]$, $CC_{PU}[2]$) suspends the feeding of the pull-up current $I_{PU}$ toward the connection terminals CH[2]. By contrast, in the second check period, the particular fault sensor 30 keeps the control switch $SW_{PU}[2]$ on and keeps the control switch $SW_{PU}[1]$ off. Accordingly, during the second check period, the pull-up circuit of the second channel (i.e., $SW_{PU}[2]$, $CC_{PU}[2]$) feeds the pull-up current $I_{PU}$ toward the connection terminal CH[2] and the pull-up circuit of the first channel (i.e., $SW_{PU}[1]$, $CC_{PU}[1]$) suspends the feeding of the pull-up current $I_{PU}$ toward the connection terminal CH[1]. Incidentally, before the first check period and after the second check period, the control switches $SW_{PU}[1]$ and $SW_{PU}[2]$ are kept off.

The first check period starts at time point t1 and ends at time point t3. The second check period starts at time point t3 and ends at time point t5. While here the end time point of the first check period and the start time point of the second check period coincide at time point t3, there may be a time lag between the end time point of the first check period and the start time point of the second check period. Within the first check period, the time point at the lapse of a predetermined time $\Delta t_A$ from time point t1 will be referred to as the check time point t2. The check time point t2 occurs earlier than time point t3. Within the second check period, the time point at the lapse of a predetermined time $\Delta t_B$ from time point t3 will be referred to as the check time point t4. The check time point t4 occurs earlier than time point t5. The predetermined times $\Delta t_A$ and $\Delta t_B$ are equal, but may be different.

Figure 10:
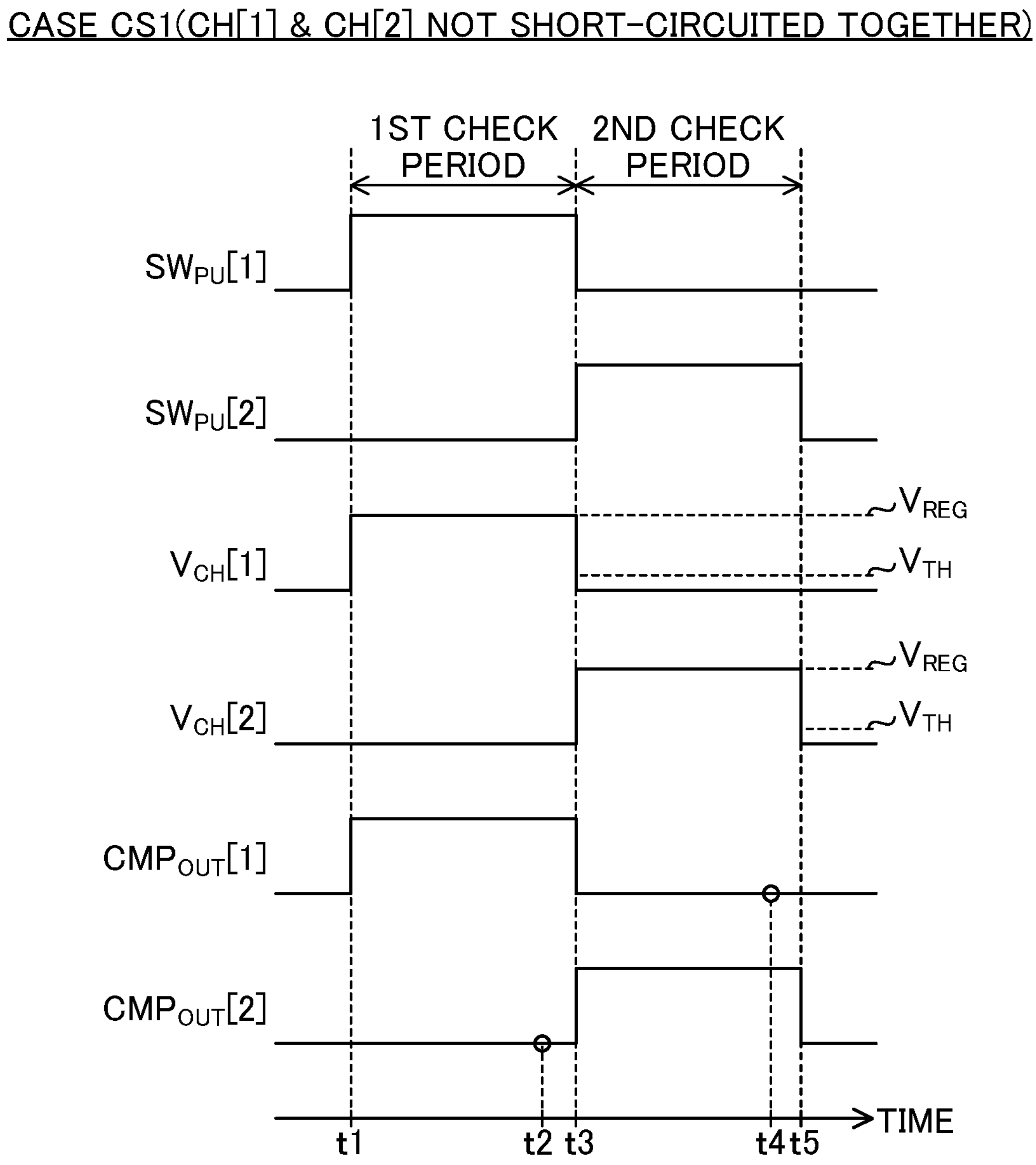
FIG. 10 is a diagram showing signal waveforms and the like during the first and second check periods according to Practical Example 1, which belongs to the embodiment of the present disclosure (case CS1).

FIG. 10 shows the states of control switches and the waveforms of terminal voltages and the like in case CS1. In case CS1, the connection terminals CH[1] and CH[2] are not short-circuited together and the resistance $R_{EXT}$ between the connection terminals CH[1] and CH[2] is sufficiently high.

In case CS1, when the first check period starts, with the pull-up current $I_{PU}$ from the constant-current circuit $CC_{PU}[1]$, the terminal voltage $V_{CH}[1]$ rises sharply from its initial voltage (e.g., 0 V) substantially to the internal voltage VREG. After that, during the period beyond the check time point t2 up to time point t3, the terminal voltage $V_{CH}[1]$ is kept substantially at the internal voltage VREG and thus the comparison result signal $CMP_{OUT}[1]$ is kept at high level. On the other hand, in case CS1, during the first check period, by the function of the constant-current circuit $CC_{PD}[2]$, the terminal voltage $V_{CH}[2]$ is kept at 0 V throughout and thus the comparison result signal $CMP_{OUT}[2]$ is kept at low level throughout.

In case CS1, when the second check period starts, with the pull-up current $I_{PU}$ from the constant-current circuit $CC_{PU}[2]$, the terminal voltage $V_{CH}[2]$ rises sharply from its initial voltage (e.g., 0 V) substantially to the internal voltage VREG. After that, during the period beyond the check time point t4 up to time point t5, the terminal voltage $V_{CH}[2]$ is kept substantially at internal voltage VREG and thus the comparison result signal $CMP_{OUT}[2]$ is kept at high level. On the other hand, in case CS1, during the second check period, by the function of the constant-current circuit $CC_{PD}[1]$, the terminal voltage $V_{CH}[1]$ is kept at 0 V throughout and thus the comparison result signal $CMP_{OUT}[1]$ is kept at low level throughout.

Figure 11:
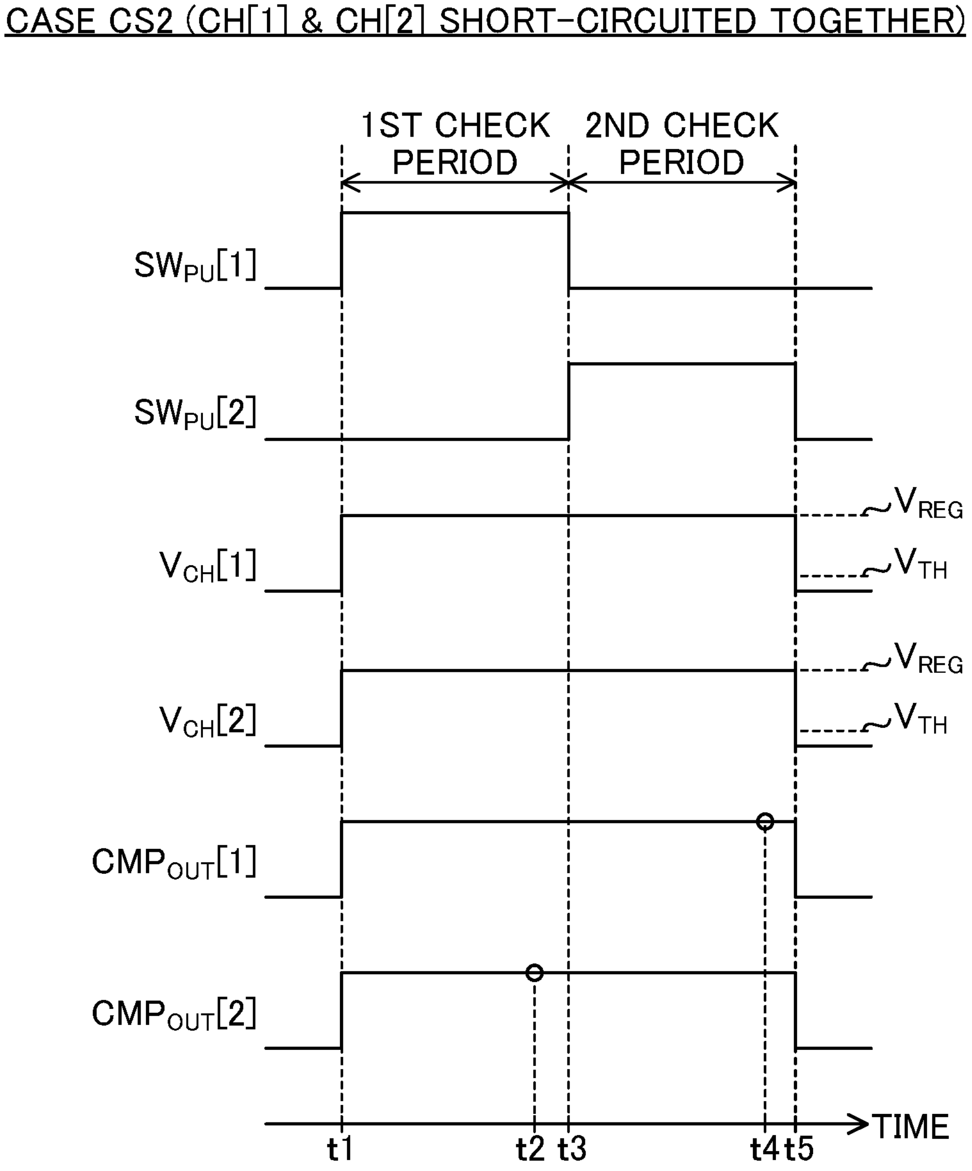
FIG. 11 is a diagram showing signal waveforms and the like during the first and second check periods according to Practical Example 1, which belongs to the embodiment of the present disclosure (case CS2).

FIG. 11 shows the states of control switches and the waveforms of terminal voltages and the like in case CS2. In case CS2, the connection terminals CH[1] and CH[2] are short-circuited together and the resistance $R_{EXT}$ between the connection terminals CH[1] and CH[2] is sufficiently low.

In case CS2, when the first check period starts, with the pull-up current $I_{PU}$ from the constant-current circuit $CC_{PU}[1]$, the terminal voltage $V_{CH}[1]$ rises sharply from its initial voltage (e.g., 0 V) substantially to the internal voltage VREG. After that, during the period beyond the check time point t2 up to time point t3, the terminal voltage $V_{CH}[1]$ is kept substantially at the internal voltage VREG and thus the comparison result signal $CMP_{OUT}[1]$ is kept at high level. Moreover, in case CS2, during the first check period, the pull-up current $I_{PU}$ from the constant-current circuit $CC_{PU}[1]$ passes via the connection terminal CH[1] and the resistance $R_{EXT}$ to the connection terminals CH[2], and hence the terminal voltage $V_{CH}[2]$ is a voltage lower than the terminal voltage $V_{CH}[1]$ by the voltage drop across the resistance $R_{EXT}$. In FIG. 11, the resistance $R_{EXT}$ is assumed to be sufficiently low, and thus, during the first check period, the terminal voltage $V_{CH}[2]$ is substantially equal to the internal voltage VREG. As a result, in case CS2, during the period beyond the check time point t2 up to time point t3, like the terminal voltage $V_{CH}[1]$, the terminal voltage $V_{CH}[2]$ is kept substantially at the internal voltage VREG and thus the comparison result signal $CMP_{OUT}[2]$ is kept at high level.

In case CS2, already at the start time point t3 of the second check period, the terminal voltage $V_{CH}[2]$ is substantially equal to the internal voltage VREG and, also after that, with the pull-up current $I_{PU}$ from the constant-current circuit $CC_{PU}[2]$, the terminal voltage $V_{CH}[2]$ is kept at the internal voltage VREG. Thus, during the entire second check period, the comparison result signal $CMP_{OUT}[2]$ is kept at high level. Moreover, in case CS2, during the second check period, the pull-up current $I_{PU}$ from the constant-current circuit $CC_{PU}[2]$ passes via the connection terminals CH[2] and the resistance $R_{EXT}$ to the connection terminals CH[1] and hence the terminal voltage $V_{CH}[1]$ is a voltage lower than terminal voltage $V_{CH}[2]$ by the voltage drop across the resistance $R_{EXT}$. In FIG. 11, the resistance $R_{EXT}$ is assumed to be sufficiently low and thus, during the second check period, the terminal voltage $V_{CH}[1]$ is substantially equal to the internal voltage VREG. As a result, in case CS2, during the entire second check period, like the terminal voltage $V_{CH}[2]$, the terminal voltage $V_{CH}[1]$ is kept substantially at the internal voltage VREG and thus the comparison result signal $CMP_{OUT}[1]$ is kept at high level.

The determiner 32 takes in, as a first and second evaluation signal, the comparison result signal $CMP_{OUT}[2]$ at the check time point t2 and the comparison result signal $CMP_{OUT}[1]$ at the check time point t4. If the first and second evaluation signals are both at high level, the determiner 32 determines the presence of a particular fault at the connection terminals CH[1] and CH[2]; otherwise, the determiner 32 determines the absence of a particular fault at the terminals CH[1] and CH[2] (in other words, it does not determine the presence of a particular fault). Accordingly, in case CS1 in FIG. 10, the absence of a particular fault at the connection terminals CH[1] and CH[2] is determined and, in case CS2 in FIG. 11, the presence of a particular fault at the connection terminals CH[1] and CH[2] is determined.

The particular fault sensing process can be understood to include a first comparison process and a second comparison process. With attention paid to two mutually adjacent connection terminals CH[1] and CH[2], the first comparison process is a process by which, by use of the comparator CMP[2], the terminal voltage $V_{CH}[2]$ at the check time point t2 is compared with the judgment voltage VTH, and the first check period includes the execution period of the first comparison process (that is, the first comparison process is executed in the first check period). On the other hand, the second comparison process is a process by which, by use of the comparator CMP [1], the terminal voltage $V_{CH}[1]$ at the check time point t4 is compared with the judgment voltage VTH, and the second check period includes the execution period of the second comparison process (that is, the second comparison process is executed in the second check period). Based on the results of the first and second comparison processes (that is, based on the first and second evaluation signals), the particular fault sensor 30 (determiner 32) senses the presence or absence of a particular fault at the connection terminals CH[1] and CH[2].

Specifically, if, in the first comparison process, with the pull-up current $I_{PU}$ fed toward one connection terminal (here, CH[1]), the voltage at the other connection terminal (here, CH[2]) is higher than the judgment voltage VTH and in addition, in the second comparison process, with the pull-up current $I_{PU}$ fed toward the other connection terminal (here, CH[2]), the voltage at the one connection terminal (here, CH[1]) is higher than the judgment voltage, the particular fault sensor 30 (determiner 32) senses the presence of a particular fault at those two connection terminals (here, CH[1] and CH[2]).

Figure 12A:
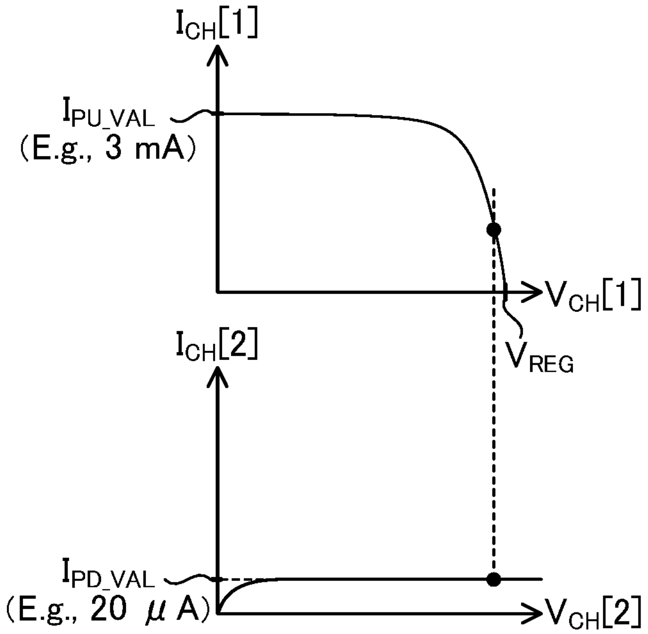
FIG. 12A is a diagram showing a relationship of the terminal voltages and the terminal currents at two connection terminals according to Practical Example 1, which belongs to the embodiment of the present disclosure.
Figure 12B:
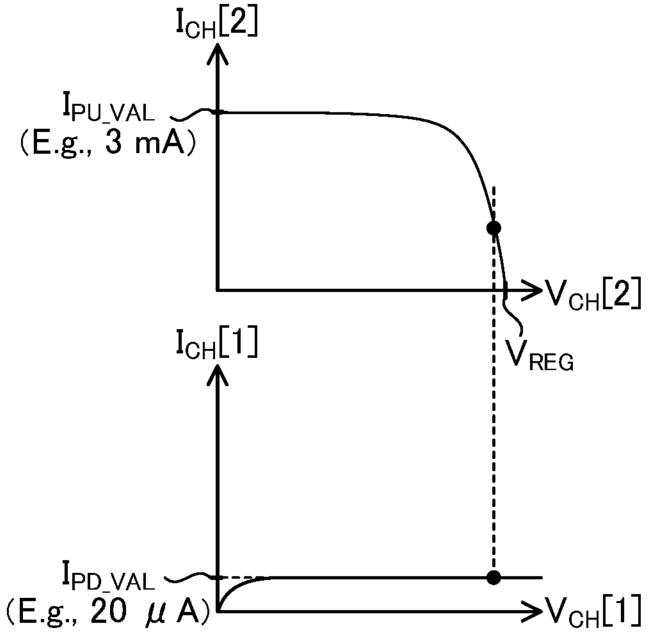
FIG. 12B is a diagram showing a relationship of the terminal voltages and the terminal currents at two connection terminals according to Practical Example 1, which belongs to the embodiment of the present disclosure.

The presence or absence of a particular fault is determined based on the magnitude of the value of the resistance $R_{EXT}$. FIG. 12A shows the relationships, in the first check period, between the terminal voltage $V_{CH}[1]$ and the terminal current $I_{CH}[1]$ and between the terminal voltage $V_{CH}[2]$ and the terminal current $I_{CH}[2]$. FIG. 12B shows the relationships, in the second check period, between the terminal voltage $V_{CH}[2]$ and the terminal current $I_{CH}[2]$ and between the terminal voltage $V_{CH}[1]$ and the terminal current $I_{CH}[1]$. The terminal current Tal[i] is the current that passes across the connection terminal CH[i]. Here, in the first check period, the terminal current $I_{CH}[1]$ is assumed to be positive when passing from inside the LED driver 1 via the connection terminal CH[1] to outside the LED driver 1 and the terminal current $I_{CH}[2]$ is assumed to be positive when passing from outside the LED driver 1 via the connection terminal CH[2] to inside the LED driver 1. By contrast, in the second check period, the terminal current $I_{CH}[2]$ is assumed to be positive when passing from inside the LED driver 1 via the connection terminal CH[2] to outside the LED driver 1 and the terminal current $I_{CH}[1]$ is assumed to be positive when passing from outside the LED driver 1 via the connection terminal CH[1] to inside the LED driver 1.

In the first check period (see FIG. 12A), the point at which the terminal currents $I_{CH}[1]$ and $I_{CH}[2]$ are just equal is the operating point. The terminal voltage $V_{CH}[2]$ at the operating point decreases as the value of the resistance $R_{EXT}$ increases and increases as the value of the resistance $R_{EXT}$ decreases. If the value of the resistance $R_{EXT}$ is so low that the terminal voltage $V_{CH}[2]$ at the operating point is higher than the judgment voltage VTH, the comparison result signal $CMP_{OUT}[2]$ in the first check period is at high level. A similar understanding applies to the second check period. If the value of the resistance $R_{EXT}$ is higher than a predetermined value, the absence of a particular fault is determined; if the value of the resistance $R_{EXT}$ is lower than the predetermined value, the presence of a particular fault is determined. The predetermined value here depends on the judgment voltage VTH.

According to Practical Example 1, it is possible to correctly sense the presence or absence of a particular fault at two connection terminals CH.

Practical Example 2

Figure 13:
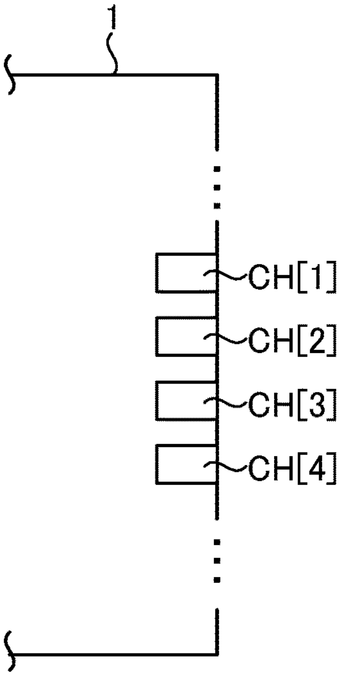
FIG. 13 is a diagram showing four connection terminals arrayed consecutively according to Practical Example 2, which belongs to the embodiment of the present disclosure.

Practical Example 2 will be described. While in Practical Example 1 attention is paid to only two connection terminals CH, any number of connection terminals CH that are arrayed consecutively can be subjected to the sensing of the presence or absence of a particular fault. Three or more connection terminals CH that are arrayed consecutively include a plurality of combinations of two mutually adjacent connection terminals CH; for each commination, the two connection terminals CH can be taken as connection terminals $CH_A$ and $CH_B$ and for each combination the presence or absence of a particular fault can be sensed my the method described in connection with Practical Example 1. For example, suppose that, as shown in FIG. 13, at one of the sides SD1 to SD4 (see FIG. 6), connection terminals CH[1] to CH[4] are arrayed consecutively. The connection terminals CH[1], CH[2], CH[3] and CH[4] are arrayed in this order along that one side. No other terminal is arranged between the connection terminals CH[1] and CH[2], between the connection terminals CH[2] and CH[3], or between the connection terminals CH[3] and CH[4]. That is, the connection terminals CH[1] and CH[2] are adjacent to each other, the connection terminals CH[2] and CH[3] are adjacent to each other, and the connection terminals CH[3] and CH[4] are adjacent to each other.

As described in connection with Practical Example 1, in the particular fault sensing process the particular fault sensor 30 sets a first and a second check period. The first and second check periods and time point t1 to t5 are in the same relationship as described in connection with Practical Example 1 (see FIG. 9).

Figure 14:
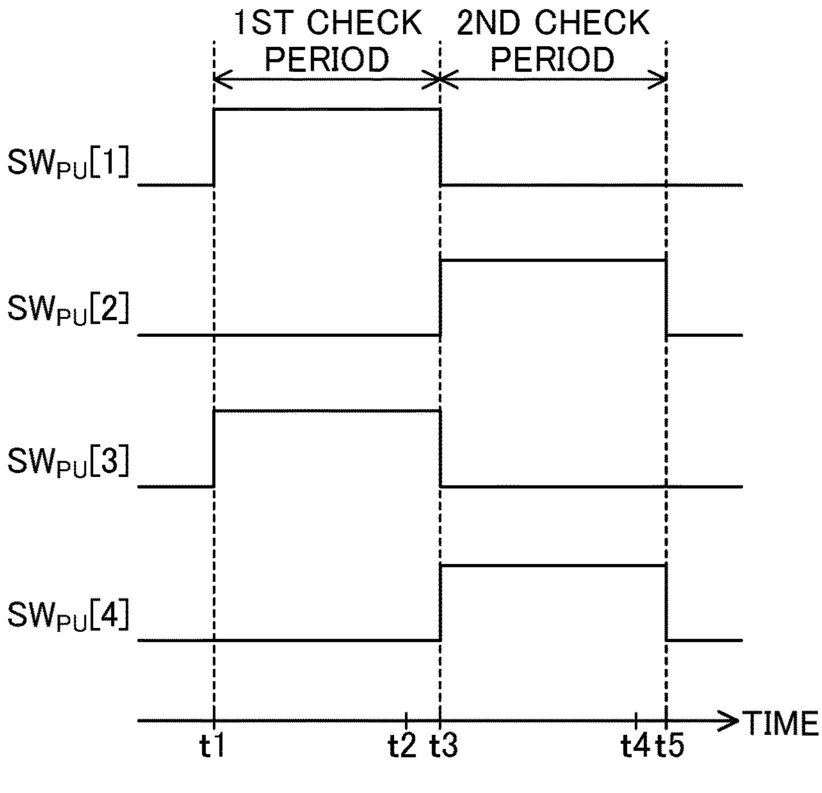
FIG. 14 is a diagram illustrating the control of switches in a situation where four connection terminals are arrayed consecutively according to Practical Example 2, which belongs to the embodiment of the present disclosure.

As shown in FIG. FIG. 14, in the first check period the particular fault sensor 30 keeps the control switches $SW_{PU}[1]$ and $SW_{PU}[3]$ on and the control switches $SW_{PU}[2]$ and $SW_{PU}[4]$ off. Accordingly, in first check period, the pull-up circuit ($SW_{PU}[1]$, $CC_{PU}[1]$) of the first channel and the pull-up circuit ($SW_{PU}[3]$, $CC_{PU}[3]$) of the third channel feed the pull-up current $I_{PU}$ toward the connection terminals CH[1] and CH[3] respectively, and the pull-up circuit ($SW_{PU}[2]$, $CC_{PU}[2]$) of the second channel and the pull-up circuit ($SW_{PU}[4]$, $CC_{PU}[4]$) of the fourth channel suspend the feeding of the pull-up current $I_{PU}$ toward the connection terminals CH[2] and CH[4] respectively. By contrast, in the second check period, the particular fault sensor 30 keeps the control switches $SW_{PU}[2]$ and $SW_{PU}[4]$ on and the control switches $SW_{PU}[1]$ and $SW_{PU}[3]$ off. Accordingly, in the second check period, the pull-up circuit ($SW_{PU}[2]$, $CC_{PU}[2]$) of the second channel and the pull-up circuit ($SW_{PU}[4]$, $CC_{PU}[4]$) of the fourth channel feed the pull-up current $I_{PU}$ toward the connection terminals CH[2] and CH[4] respectively, and the pull-up circuit ($SW_{PU}[1]$, $CC_{PU}[1]$) of the first channel and the pull-up circuit ($SW_{PU}[3]$, $CC_{PU}[3]$) of the third channel suspend the feeding of the pull-up current $I_{PU}$ toward the connection terminals CH[1] and CH[3] respectively. Incidentally, before the first check period and after the second check period, the control switches $SW_{PU}[1]$ to $SW_{PU}[4]$ are kept off.

The determiner 32 senses the presence or absence of a particular fault for each combination of two adjacent connection terminals CH. Specifically, the determiner 32 takes in, as two evaluation signals, the comparison result signal $CMP_{OUT}[2]$ at the check time point t2 and the comparison result signal $CMP_{OUT}[1]$ at the check time point t4 and, if the two evaluation signals are both at high level, determines the presence of a particular fault at the connection terminals CH[1] and CH[2]; otherwise, the determiner 32 determines the absence of a particular fault at the connection terminals CH[1] and CH[2] (in other words, it does not determine the presence of a particular fault). Likewise, the determiner 32 takes in, as two evaluation signals, the comparison result signal $CMP_{OUT}[2]$ at the check time point t2 and the comparison result signal $CMP_{OUT}[3]$ at the check time point t4 and, if the two evaluation signals are both at high level, determines the presence of a particular fault at the connection terminals CH[2] and CH[3]; otherwise, the determiner 32 determines the absence of a particular fault at the connection terminals CH[2] and CH[3] (in other words, it does not determine the presence of a particular fault). Furthermore, the determiner 32 takes in, as two evaluation signals, the comparison result signal $CMP_{OUT}[4]$ at the check time point t2 and the comparison result signal $CMP_{OUT}[3]$ at the check time point t4 and, if the two evaluation signals are both at high level, determines the presence of a particular fault at the connection terminals CH[3] and CH[4]; otherwise, the determiner 32 determines the absence of a particular fault at the connection terminals CH[3] and CH[4] (in other words, it does not determine the presence of a particular fault).

The particular fault sensing process can be understood to include a first comparison process and a second comparison process. With attention paid to the connection terminals CH[1] to CH[4], the first comparison process corresponds to a process by which, by use of the comparators CMP[2] and CMP[4], the terminal voltages $V_{CH}[2]$ and $V_{CH}[4]$ at the check time point t2 are each compared with the judgment voltage VTH, and the first check period includes the execution period of the first comparison process (that is, the first comparison process is executed in the first check period). By contrast, the second comparison process corresponds to a process by which, by use of the comparators CMP [1] and CMP [3], the terminal voltage $V_{CH}[1]$ and $V_{CH}[3]$ at the check time point t4 are each compared with the judgment voltage VTH, and the second check period includes the execution period of the second comparison process (that is, the second comparison process is executed in the second check period). Based on the results of the first and second comparison processes, the particular fault sensor 30 (determiner 32) senses, individually, the presence or absence of a particular fault at the connection terminals CH[1] and CH[2], the presence or absence of a particular fault at the connection terminals CH[2] and CH[3], and the presence or absence of a particular fault at the connection terminals CH[3] and CH[4].

Specifically, assuming that i is a variable that takes the value of one, two, or three, if, with the pull-up current $I_{PU}$ fed toward the connection terminal CH[i], the voltage at the connection terminal CH[i+1] is higher than the judgment voltage VTH and in addition, with the pull-up current $I_{PU}$ fed toward the connection terminal CH[i+1], the voltage at the connection terminal CH[i] is higher than the judgment voltage VTH, the particular fault sensor 30 (determiner 32) senses the presence of a particular fault at the connection terminals CH[i] and CH[i+1].

While here, for the sake of concreteness, attention is paid to four connection terminals CH[1] to CH[4], a similar description applies to cases where five or more connection terminals CH are arrayed consecutively along any one of the sides SD1 to SD4 (see FIG. 6). For example, consider a case where connection terminals CH[1], CH[2], CH[3], . . . , and CH[2×k] are arrayed in this order along that one side (where k is an integer of three or more) such that, for any natural number p, the connection terminals CH[p] and CH[p+1] are adjacent to each other. In this case, the first, third, . . . , and (2×k−1)th channels are classified into odd-numbered channels, and the second, fourth, . . . , and (2×k)th channels are classified into even-numbered channels.

In the first check period, the particular fault sensor 30 keeps the control switches $SW_{PU}[1]$, $SW_{PU}[3]$, . . . , and $SW_{PU}[2×k−1]$ of the odd-numbered channels on and the control switches $SW_{PU}[2]$, $SW_{PU}[4]$, . . . , and $SW_{PU}[2×k]$ of the even-numbered channels off. Accordingly, in the first check period, the pull-up circuits of the odd-numbered channels feed the pull-up current $I_{PU}$ toward the connection terminals (CH[1], CH[3], . . . , and CH[2×k−1]) of the odd-numbered channels, and the pull-up circuits of the even-numbered channels suspend the feeding of the pull-up current $I_{PU}$ toward the connection terminals (CH[2], CH[4], . . . , and CH[2×k]) of the even-numbered channels. By contrast, in the second check period, the particular fault sensor 30 keeps the control switches $SW_{PU}$[2], $SW_{PU}$[4], . . . , and $SW_{PU}$[2×k] of the even-numbered channels on and the control switches $SW_{PU}$[1], $SW_{PU}$[3], . . . , and $SW_{PU}$[2×k−1] of the odd-numbered channels off. Accordingly, in the second check period, the pull-up circuits of the even-numbered channels feed the pull-up current $I_{PU}$ toward the connection terminals (CH[2], CH[4], . . . , and CH[2×k]) of the even-numbered channels, and the pull-up circuits of the odd-numbered channels suspend the feeding of the pull-up current $I_{PU}$ toward the connection terminals (CH[1], CH[3], . . . , and CH[2×k−1]) of the odd-numbered channels. Incidentally, before the first check period and after the second check period, the control switches $SW_{PU}$[1] to $SW_{PU}$[24] are all kept off.

The determiner 32 senses the presence or absence of a particular fault for each combination of two adjacent connection terminals CH. That is, individually for each integer q that fulfills 1≤q≤k, the determiner 32 takes in, as two evaluation signals, the comparison result signal $CMP_{OUT}$[2×q] at the check time point t2 and the comparison result signal $CMP_{OUT}$[2× q−1] at the check time point t4 and, if the two evaluation signals are both at high level, determines the presence of a particular fault at the connection terminals CH[2×q−1] and CH[2×q]; otherwise, the determiner 32 determines the absence of a particular fault at the connection terminals CH[2×q−1] and CH[2×q] (in other words, it does not determine the presence of a particular fault). Likewise, individually for each integer q that fulfills 1≤q≤k−1, the determiner 32 takes in, as two evaluation signals, the comparison result signal $CMP_{OUT}$[2×q] at the check time point t2 and the comparison result signal $CMP_{OUT}$[2×q+1] at the check time point t4 and, if the two evaluation signals are both at high level, determines the presence of a particular fault at the connection terminals CH[2×q] and CH[2×q+1]; otherwise, the determiner 32 determines the absence of a particular fault at the connection terminals CH[2×q] and CH[2×q+1] (in other words, it does not determine the presence of a particular fault).

According to Practical Example 2, it is possible to sense the presence or absence of a particular fault, individually, between any mutually adjacent connection terminals among a plurality of connection terminals CH comprising a number of them.

Practical Example 3

Practical Example 3 will be described. If with respect to a given combination of two connection terminals CH the presence of a particular fault is sensed, the control block 20 stores, in a register (not shown) provided in it, fault presence data indicating the presence of the fault and fault location data indicating the combination of connection terminals CH where the fault is present. Moreover, if the presence of any fault, including a particular fault, is sensed in the LED driver 1, the control block 20 turns to low level the signal level on the wiring 6, which is normally at high level, and thereby notifies the MPU 2 of the presence of the fault. On recognizing the signal level on the wiring 6 turning to low level, the MPU 2 can as necessary transmit to the LED driver 1 an error read command requesting transmission of the data stored in the above-mentioned register. On receiving the error read command, the LED driver 1 transmits data including the fault presence data and the fault location data to the MPU 2, which can then based on the received data recognize what is indicated by the fault presence data and the fault location data.

Based on the received data including the fault presence data and the fault location data, the MPU 2 can execute a predetermined fault handling process. For example, in a case where a light-emitting block comprising the light-emitting units LL[1, 1] to LL[24, 8] is used as a light source in a display panel such as a liquid crystal display panel, where the entire display region of the display panel is divided into a plurality of division regions (e.g., 24×8 division regions), and where each division region is assigned one or more light-emitting units LL, if the presence of a particular fault is sensed at the connection terminals CH[1] and CH[2], the image to be displayed on the display panel is displayed in a normal display region. Here, the normal display region is a display region excluding the division regions that are assigned the light-emitting units LL[1, 1] to LL[1, 8] and LL[2, 1] to LL[2, 8] of the first and second channels.

Practical Example 4

Practical Example 4 will be described. Practical Example 4 deals with applied technologies and modified technologies in connection with what has been described above.

A light-emitting block comprising the light-emitting units LL[1, 1] to LL[24, 8] can be used as a light source in a variety of devices, for example as a light source in a display panel as described above. A light-emitting system SYS can be incorporated in particular in, for example, vehicles such as automobiles. In such cases, a light-emitting block as described above can be used as a light source in a cluster panel for displaying a vehicle's speed, engine revolution, remaining fuel, and the like, in a display panel for car navigation, in a head-up display, or in a center information display.

While in the configuration described above there are 24 channels and 8 groups (see FIGS. 1 to 3), there may be any number, two or more, of channels and any number, two or more, of groups.

There may by only one group. Specifically, while in the configuration described above each connection terminal CH has connected to it as many light-emitting units LL as the number of groups in parallel, a configuration is also possible where each connection terminal CH has a single light-emitting unit LL connected to it. For example, out of the light-emitting units LL[1, 1] to LL[24, 8], only a total of 24 light-emitting units LL[1, 1], LL[2, 2], LL[3, 3], . . . , and LL[24, 24] may be provided in alight-emitting system SYS. In that case, it is possible to achieve local dimming (local brightness adjustment) corresponding to 24 division regions at the maximum.

According to the present disclosure, a light-emitting unit LL can include one or more light-emitting elements that emit light by being supplied with a current. A light-emitting diode as a light-emitting element may be any kind of light-emitting diode, and may be an organic LED that produces organic electroluminescence. A light-emitting element may be one that is not classified as an LED, and may be, for example, a laser diode.

The LED driver 1 is an example of a light-emitting element driving device for driving light-emitting units LL, and the embodiment described above deals with an example where the technologies according to the present disclosure (including the technology for sensing particular faults) are applied to a light-emitting element driving device. This however is not meant to exclude the technologies according to the present disclosure being applied to any other devices. Specifically, for example, the technology for sensing particular faults according to the present disclosure can be employed to sense the presence or absence of a particular fault between any two mutually adjacent terminals provided in any device.

For any signal or voltage, the relationship of its high and low levels may be reversed unless inconsistent with what is disclosed herein.

Embodiments of the present disclosure can be modified in many ways as necessary without departure from the scope of the technical concepts defined in the appended claims. The embodiments described herein are merely examples of how the present disclosure can be implemented, and what is meant by any of the terms used to describe the present disclosure and its constituent elements is not limited to that mentioned in connection with the embodiments. The specific values mentioned in the above description are merely illustrative and needless to say can be modified to different values.

<<Notes>>

To follow is a study on the technical ideas implemented in the embodiments described above.

According to one aspect of the present disclosure, a light-emitting element driving device includes connection terminals corresponding to a plurality of channels, and these connection terminals are configured to be connectable to light-emitting units having one or more light-emitting elements. The light-emitting element driving device is configured to be capable of supplying driving currents to the light-emitting units via the connection terminals individually for each of the channels. The light-emitting element driving device includes a particular fault sensor configured to be capable of executing a sensing process for sensing a particular fault during a non-supply period of the driving currents to the light-emitting units. The particular fault is an abnormality in the resistance value between two connection terminals adjacent to each other among the plurality of connection terminals. The particular fault sensor includes: a pull-up circuit configured to be capable of feeding a pull-up current toward the connection terminals individually for each of the channels; and a comparator configured to compare a voltage at the connection terminals with a predetermined judgment voltage. The sensing process includes: a first comparison process by which, with the pull-up current fed toward one of the two connection terminals, the voltage at the other of the two connection terminals is compared with the judgment voltage; and a second comparison process by which, with the pull-up current fed toward the other of the two connection terminals, the voltage at the one of the two connection terminals is compared with the judgment voltage. Based on the results of the first and second comparison processes, the particular fault sensor senses the presence or absence of the particular fault at the two connection terminals. (A first configuration.)

In the light-emitting element driving device of the first configuration described above, preferably, if, in the first comparison process, with the pull-up current fed toward the one of the two connection terminals, the voltage at the other of the two connection terminals is higher than the judgment voltage and in addition, in the second comparison process, with the pull-up current fed toward the other of the two connection terminals, the voltage at the one of the two connection terminals is higher than the judgment voltage, the particular fault sensor senses the presence of the particular fault at the two connection terminals. (A second configuration.)

In the light-emitting element driving device of the first or second configuration described above, preferably, the one and the other of the two connection terminals are connection terminals of a first and a second channel respectively. Preferably, during the execution period of the first comparison process, a pull-up circuit of the first channel feeds the pull-up current toward the one of the two connection terminals and a pull-up circuit of the second channel suspends the feeding of the pull-up current toward the other of the two connection terminals; during the execution period of the second comparison process, the pull-up circuit of the second channel feeds the pull-up current toward the other of the two connection terminals and the pull-up circuit of the first channel suspends the feeding of the pull-up current toward the one of the two connection terminals. (A third configuration.)

In the light-emitting element driving device of the first configuration described above, preferably, the plurality of connection terminals include a first to a fourth connection terminal. Preferably, the first to fourth connection terminals are arrayed consecutively in this order. Preferably, in the first comparison process, the particular fault sensor compares, with the pull-up current fed toward each of the first and third connection terminals, the voltages at the second and fourth connection terminals each with the judgment voltage and, in the second comparison process, the particular fault sensor compares, with the pull-up current fed toward each of the second and fourth connection terminals, the voltages at the first and third connection terminals each with the judgment voltage. Preferably, based on the results of the first and second comparison processes, the particular fault sensor senses, individually, the presence or absence of the particular fault at the first and second connection terminals, the presence or absence of the particular fault at the second and third connection terminals, and the presence or absence of the particular fault at the third and fourth connection terminals. (A fourth configuration.)

In the light-emitting element driving device of the fourth configuration described above, preferably, if, with the pull-up current fed toward the ith connection terminal, the voltage at the (i+1)th connection terminal is higher than the judgment voltage and in addition, with the pull-up current fed toward the (i+1)th connection terminal, the voltage at the ith connection terminal is higher than the judgment voltage, the particular fault sensor senses the presence of the particular fault at the ith and (i+1)th connection terminals, where i is one, two, or three. (A fifth configuration.)

In the light-emitting element driving device of the fourth or fifth configuration described above, preferably, the first to fourth connection terminals are connection terminal of a first to a fourth channel respectively. Preferably, during the execution period of the first comparison process, pull-up circuits of the first and third channels feed the pull-up current toward the first and third connection terminals and pull-up circuits of the second and fourth channels suspend the feeding of the pull-up current toward the second and fourth connection terminals; during the execution period of the second comparison process, the pull-up circuits of the second and fourth channels feed the pull-up current toward the second and fourth connection terminals and the pull-up circuits of the first and third channels suspend the feeding of the pull-up current toward the first and third connection terminals. (A sixth configuration.)

In the light-emitting element driving device of any of the first to sixth configurations described above, preferably, the particular fault sensor includes, for each of the channels, a pull-down circuit configured to draw a pull-down current from the corresponding one of the connection terminals, and the pull-down current is set at a magnitude lower than the magnitude of the pull-up current. (A seventh configuration.)

The invention claimed is:

1. A light-emitting element driving device comprising connection terminals corresponding to a plurality of channels, the connection terminals being configured to be connectable to light-emitting units having one or more light-emitting elements, the light-emitting element driving device being configured to be capable of supplying driving currents to the light-emitting units via the connection terminals individually for each of the channels, wherein the light-emitting element driving device includes a particular fault sensor configured to be capable of executing a sensing process for sensing a particular fault during a non-supply period of the driving currents to the light-emitting units, the particular fault being an abnormality in a resistance value between two connection terminals adjacent to each other among the plurality of connection terminals, the particular fault sensor includes:

a pull-up circuit configured to be capable of feeding a pull-up current toward the connection terminals individually for each of the channels; and a comparator configured to compare a voltage at the connection terminals with a predetermined judgment voltage, the sensing process includes:

a first comparison process by which, with the pull-up current fed toward one of the two connection terminals, a voltage at another of the two connection terminals is compared with the judgment voltage; and a second comparison process by which, with the pull-up current fed toward the other of the two connection terminals, a voltage at the one of the two connection terminals is compared with the judgment voltage, and based on results of the first and second comparison processes, the particular fault sensor senses presence or absence of the particular fault at the two connection terminals.

2. The light-emitting element driving device according to claim 1, wherein if, in the first comparison process, with the pull-up current fed toward the one of the two connection terminals, the voltage at the other of the two connection terminals is higher than the judgment voltage and in addition, in the second comparison process, with the pull-up current fed toward the other of the two connection terminals, the voltage at the one of the two connection terminals is higher than the judgment voltage, the particular fault sensor senses presence of the particular fault at the two connection terminals.

3. The light-emitting element driving device according to claim 1, wherein the one and the other of the two connection terminals are connection terminals of a first and a second channel respectively, during an execution period of the first comparison process, a pull-up circuit of the first channel feeds the pull-up current toward the one of the two connection terminals and a pull-up circuit of the second channel suspends feeding of the pull-up current toward the other of the two connection terminals, and during an execution period of the second comparison process, the pull-up circuit of the second channel feeds the pull-up current toward the other of the two connection terminals and the pull-up circuit of the first channel suspends feeding of the pull-up current toward the one of the two connection terminals.

4. The light-emitting element driving device according to claim 1, wherein the plurality of connection terminals include a first to a fourth connection terminal, the first to fourth connection terminals are arrayed consecutively in this order, in the first comparison process, the particular fault sensor compares, with the pull-up current fed toward each of the first and third connection terminals, voltages at the second and fourth connection terminals each with the judgment voltage and, in the second comparison process, the particular fault sensor compares, with the pull-up current fed toward each of the second and fourth connection terminals, voltages at the first and third connection terminals each with the judgment voltage, and based on results of the first and second comparison processes, the particular fault sensor senses, individually, presence or absence of the particular fault at the first and second connection terminals, presence or absence of the particular fault at the second and third connection terminals, and presence or absence of the particular fault at the third and fourth connection terminals.

5. The light-emitting element driving device according to claim 4, wherein if, with the pull-up current fed toward an ith connection terminal, a voltage at an (i+1)th connection terminal is higher than the judgment voltage and in addition, with the pull-up current fed toward the (i+1)th connection terminal, a voltage at the ith connection terminal is higher than the judgment voltage, the particular fault sensor senses presence of the particular fault at the ith and (i+1)th connection terminals, where i is one, two, or three.

6. The light-emitting element driving device according to claim 4, wherein the first to fourth connection terminals are connection terminal of a first to a fourth channel respectively, during an execution period of the first comparison process, pull-up circuits of the first and third channels feed the pull-up current toward the first and third connection terminals and pull-up circuits of the second and fourth channels suspend feeding of the pull-up current toward the second and fourth connection terminals, and during an execution period of the second comparison process, the pull-up circuits of the second and fourth channels feed the pull-up current toward the second and fourth connection terminals and the pull-up circuits of the first and third channels suspend feeding of the pull-up current toward the first and third connection terminals.

7. The light-emitting element driving device according to claim 1, wherein the particular fault sensor includes, for each of the channels, a pull-down circuit configured to draw a pull-down current from a corresponding one of the connection terminals, the pull-down current being set at a magnitude lower than a magnitude of the pull-up current.

* * * * *